United States Patent
Hirata et al.

(10) Patent No.: US 10,890,763 B2
(45) Date of Patent: Jan. 12, 2021

(54) INFORMATION DISPLAY APPARATUS

(71) Applicant: Maxell, Ltd., Kyoto (JP)

(72) Inventors: Koji Hirata, Kyoto (JP); Masahiko Yatsu, Kyoto (JP); Toshinori Sugiyama, Kyoto (JP); Akio Misawa, Kyoto (JP); Shigeki Hoshino, Kyoto (JP); Kazuomi Kaneko, Kyoto (JP); Tatsuya Nakazawa, Kyoto (JP); Takumi Nakada, Kyoto (JP); Yuki Nagano, Kyoto (JP); Tomoki Yamamoto, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/349,641

(22) PCT Filed: Nov. 13, 2017

(86) PCT No.: PCT/JP2017/040770
§ 371 (c)(1),
(2) Date: May 14, 2019

(87) PCT Pub. No.: WO2018/092720
PCT Pub. Date: May 24, 2018

(65) Prior Publication Data
US 2019/0346676 A1 Nov. 14, 2019

(30) Foreign Application Priority Data
Nov. 21, 2016 (JP) .................. 2016-225659

(51) Int. Cl.
*G02B 27/01* (2006.01)
*G02B 27/28* (2006.01)
(Continued)

(52) U.S. Cl.
CPC ....... *G02B 27/0101* (2013.01); *G02B 27/283* (2013.01); *G03B 21/28* (2013.01);
(Continued)

(58) Field of Classification Search
None
See application file for complete search history.

(56) References Cited

U.S. PATENT DOCUMENTS 5,502,456 A 3/1996 Korenaga et al.
10,145,999 B2 * 12/2018 Wang .................. G02B 5/3066
(Continued)

FOREIGN PATENT DOCUMENTS

CN 103270436 A 8/2013
JP 58-139833 A 8/1983
(Continued)

OTHER PUBLICATIONS

Yasuo Tanahashi, et al., "Development of Full-Color Head-Up Display Using Laser Projector" Pioneer R&D vol. 22, 2013, p. 1-7.
(Continued)

*Primary Examiner* — Joseph R Haley
(74) *Attorney, Agent, or Firm* — Mattingly & Malur, PC

(57) ABSTRACT

Provided is an information display apparatus that significantly improves light resistance with respect to sunlight. The information display apparatus, which displays video-image information on a projection surface by a virtual image, includes in a housing partly having an opening: a video-image-light generator that generates video-image light for displaying the video-image information; a video-image-light processor that performs a predetermined optical processing to a video image generated by the video-image-light generator; and a projector that projects, onto the projection surface through the opening of the housing, the video-image light optically processed by the video-image-light processor
(Continued)

so that a viewer is capable of virtually recognizing the video-image information as a virtual image in front of the projection surface, wherein a light path in the housing is provided with a suppressor selectively suppressing a P-polarizing component of light in a visible light region.

6 Claims, 20 Drawing Sheets

(51) Int. Cl.
  *G03B 21/28* (2006.01)
  *H04N 9/31* (2006.01)

(52) U.S. Cl.
  CPC ..... *H04N 9/3179* (2013.01); *G02B 2027/011* (2013.01); *G02B 2027/014* (2013.01)

(56) References Cited

U.S. PATENT DOCUMENTS

| | | |
|---|---|---|
| 2002/0084950 A1 | 7/2002 | Aoki et al. |
| 2002/0118462 A1 | 8/2002 | Nill |
| 2006/0018119 A1 | 1/2006 | Sugikawa et al. |
| 2011/0170023 A1 | 7/2011 | Ishida |
| 2013/0279016 A1 | 10/2013 | Finger |
| 2016/0195719 A1 | 7/2016 | Yonetani |
| 2018/0164585 A1* | 6/2018 | Nambara ............... B60K 37/02 |
| 2019/0137760 A1* | 5/2019 | Tsukamoto ............. G06F 3/165 |
| 2019/0227308 A1* | 7/2019 | Yokoe ................ G02B 27/0101 |

FOREIGN PATENT DOCUMENTS

| | | |
|---|---|---|
| JP | 62-275845 A | 11/1987 |
| JP | 06-305342 A | 11/1994 |
| JP | 2000-131682 A | 5/2000 |
| JP | 2002-202475 A | 7/2002 |
| JP | 2006-039029 A | 2/2006 |
| JP | 2011-145393 A | 7/2011 |
| JP | 4788882 B2 | 10/2011 |
| JP | 2014-183192 A | 9/2014 |
| JP | 2012-152732 A | 8/2015 |
| JP | 2015-194707 A | 11/2015 |
| WO | 2016/136407 A1 | 9/2016 |

OTHER PUBLICATIONS

International Search Report of PCT/JP2017/040770 dated Jan. 30, 2018.
Japanese Office Action received in corresponding Japanese Application No. 2016-225659 dated Oct. 27, 2020.

* cited by examiner

REFLECTANCE OF GLASS TO P-POLAIRIZED LIGHT AND S-POLARAIZED LIGHT (a)

(b)

(a)

(b)

(a)

(b)

(a)

(b)

(c)

(d)

INFORMATION DISPLAY APPARATUS

TECHNICAL FIELD

The present invention relates to an information display apparatus for projecting an image(s) onto a windshield or combiner of an automobile, train, and aircraft, etc. (hereinafter, generally referred to as "vehicle"), and to a projection optical system in which the image is observed as a virtual image through the windshield and to an information display apparatus using the projection optical system.

BACKGROUND ART

Already known by Patent Document 1 as mentioned below has been a head-up-display (HUD) apparatus that projects video-image light onto a windshield or combiner of an automobile to form a virtual image(s) and to display traffic information such as route information or traffic congestion information, and vehicle information such as fuel remaining amount or coolant temperature.

Regarding this type of information display apparatus, broadening an area in which a driver can observe (view) the virtual image is desired, while the virtual image with high resolution and high visibility is also an important factor for performance.

The head-up-display apparatus uses an optical system including a concave mirror (having action of a convex lens) to magnify a video image(s) displayed on a video-image display apparatus and provides, as a virtual image(s), the magnified video image to the driver, thus always requiring the windshield or combiner as final reflection surface.

A liquid crystal display element has been often used as the video-image display apparatus utilized in the above HUD apparatus since easily obtaining a high-quality video image(s) and being inexpensive. However, newly clarified has been a problem of bringing significant deterioration (reduction) in performance under a predetermine condition(s) in daytime since sunlight passes through the windshield, is condensed by the concave mirror, and damages a liquid crystal panel and a polarizer (polarizing plate).

The present invention relates to a technical means for reducing the damages given to the liquid crystal display element and the polarizer by the sunlight as mentioned above.

Additionally, according to Patent Document 2 as mentioned below, already known has been a HUD apparatus having a structure in which, for reducing the possibility that a liquid crystal display panel will be damaged by the sunlight, a transmission/reflection member (hot mirror) for causing display light from a liquid crystal display panel to be transmitted and infrared rays to be reflected is provided on a front side of and separately from the liquid crystal display panel in a non-parallel state thereto.

Meanwhile, for example, an apparatus that attaches a main body including a combiner near a ceiling (sun visor) of an automobile has been also proposed as disclosed in Non-Patent Document 1 as mentioned below. However, still remains a safety problem such as the possibility that the driver will suffer an injury when the HUD apparatus is removed from the driver at a time of causing any collision. For this reason, a method of reflecting video-image light directly onto the windshield will conceivably become a mainstream as the HUD apparatus in the future.

RELATED ART DOCUMENTS

Patent Documents

Patent Document 1: Japanese Patent Application Laid-open No. 2015-194707
Patent Document 2: Japanese Patent No. 4788882

Non-Patent Documents

Non-Patent Document 1: PIONEER R&D (Vol. 22,2013)

SUMMARY OF THE INVENTION

Problems to Be Solved By the Invention

An example of the HUD apparatus disclosed in Patent Document 1 as the above-mentioned conventional technique includes: a display device for displaying an image(s); and a projection optical system for projecting the image displayed on the display device. The above example further has, as the projection optical system, first and second mirrors in (on) a light path (optical path) of an observer (viewer) from the display device, thereby realizing the apparatus by satisfying a predetermined condition(s) about a relationship among: an incident angle in an image long-axial direction of the first mirror; an incident angle in an image short-axial direction of the first mirror; an interval between the an image displaying surface of the display device and the first mirror; and a horizontal width of the virtual image visually recognized by the observer). However, the conventional technique has not described any new problem of bringing the significant deterioration (reduction) in performance under the above-mentioned predetermine condition in daytime since the sunlight passes through the windshield, is condensed by the concave mirror, and damages the liquid crystal panel and the polarizer.

In the future, a method of using the windshield as a reflection surface as described in Patent Document 1 will conceivably become the mainstream. However, the following phenomenon, a so-called burning (yellowing carbonation) occurs: the polarizer or liquid crystal panel itself, which is provided on a light-emission side of a liquid crystal display apparatus, leads to having no normal function under the predetermined condition in daytime since being transformed by heat and light-ray intensity of the sunlight that passes through the windshield and is condensed by a concave mirror.

Similarly, a technique disclosed in Non-Patent Document 1 in which a final reflection surface is a combiner has not considered a new problem of bringing the significant deterioration in performance under the predetermine condition in daytime since the sunlight passes through the windshield and combiner, is condensed by the concave mirror, and damages the liquid crystal panel and the polarizer.

Also, the example of the HUD apparatus disclosed in Patent Document 1 as the conventional technique is established by including: the display device for displaying the image; and the projection optical system for projecting the image displayed on the display device, and by providing as the projection optical system the first and second mirrors on the light path from the display device to the observer. However, since disposing no optical element between the concave mirror and the liquid crystal panel serving as a video-image display apparatus, the above example has not considered a new problem of bringing significant deteriorate in quality of the video image visually recognized by the driver, particularly, in contrast performance and apparent resolution besides the above problem since light passing through the windshield, condensed by the concave mirror, and reflected by a surface of the optical element disposed between the liquid crystal panel and the concave mirror returns to eyes of the driver and overlaps the visual image obtained by the video-image display apparatus.

Further, according to Patent Document 2, disposing on the light path the transmission reflection member (hot mirror) for selectively reflecting infrared rays of the sunlight is proposed for reducing a possibility of damaging the liquid crystal display panel due to the sunlight. However, the entering (invading) sunlight contains not only the infrared rays but also light rays having a visible region and an ultraviolet region, so that the reduction only in the infrared rays is insufficient to reduce the damages to the liquid crystal display element and the polarizer due to the sunlight. That is, Patent Document 2 has not made any consideration about a new problem of bringing the significant deteriorate in quality of the video image visually recognized by the driver, particularly, in contrast performance and apparent resolution, the deterioration being an adverse effect (influence) due to entry of external light including visible light as described above.

Thus, the liquid crystal display element is often used as a video-image display apparatus utilized for the above HUD apparatus since being capable of easily obtaining a high-quality video image(s) and being inexpensive. However, the sunlight under the predetermined condition in daytime passes through the windshield, is condensed by the concave mirror, and brings image damages to the liquid crystal panel and the polarizer, which has consequently clarified one new problem of significantly reducing performance.

Further, surface reflection of the optical element disposed between the concave mirror and the video-image display apparatus is reduced for miniaturizing the HUD apparatus, and a part of the sunlight returns to a driver's visual point (eye) and overlaps the virtual image obtained by the video-image display apparatus, which has clarified a second problem of bringing significant deteriorate in quality of the video image visually recognized by the driver, particularly, in contrast performance and apparent resolution.

The present invention has an object of providing an information display apparatus, which resolves the significant deteriorate in quality of the video image visually recognized by the driver, particularly, in the contrast performance and the apparent resolution since the damages to the liquid crystal display element and the polarizer due to infrared components of the sunlight are mainly reduced and illumination light with high specific intensity in daytime or nighttime is reflected onto the surface of the optical element disposed between the video-image display apparatus forming the information display apparatus and the concave mirror, returns to the driver's eyes, and overlaps the virtual image obtained by the video-image display apparatus. That is, the present invention has an object of providing the information display apparatus capable of reducing an adverse effect(s) due to light having the wide-ranged wavelengths contained in external light including the sunlight.

Means for Solving the Problem

The present invention is an invention for attaining the above-mentioned object and is, as one example, an information display apparatus. The information display apparatus, which displays video-image information on a projection surface by a virtual image, includes in a housing partly having an opening: a video-image-light generator configured to generate video-image light for displaying the video-image information; a video-image-light processor configured to perform a predetermined optical processing to a video image generated by the video-image-light generator; and a projector configured to project, onto the projection surface through the opening of the housing, the video-image light optically processed by the video-image-light processor so that a viewer is capable of virtually recognizing the video-image information as a virtual image in front of the projection surface, wherein a light path in the housing is provided with a suppressor selectively suppressing a P-polarizing component of light in a visible light region.

More specifically, although detailed below, the virtual image optical system ranging from the concave mirror to the video-image display apparatus (liquid crystal panel) in the information display apparatus of the present invention:

(1) is provided with an optical means in which the sunlight passing through the windshield and the combiner and condensed by the concave mirror is prevented from returning to the liquid crystal panel and the polarizer under the predetermined condition in daytime;
(2) prevents the sunlight condensed by the concave mirror from returning to the video-image display apparatus by rotating the concave mirror up to such a predetermined angle that the sunlight does not return to the video-image display apparatus when the information display apparatus is not used; and
(3) is provided with such an optical means that apart of the sunlight does not return to the driver's visual point (eye), thereby providing an information display apparatus that significantly improves resistance to external light including the sunlight and a deterioration in image quality.

Effects of the Invention

The present invention makes it possible to: correct distortion and aberration of the virtual image observed by the driver due to external light including the sunlight along with realization of the apparatus's miniaturization; and simultaneously reduce such a state that external light including the sunlight entering through the windshield is condensed by the concave mirror forming the virtual-image optical system, damages the liquid crystal panel serving as the video-image display apparatus or/and the polarizer, and deteriorates their performance. That is, the present invention can provide the information display apparatus that reduces the adverse effect due to the light having a wide-ranged wavelengths in the external light containing the sunlight and forms a virtual image(s) of excellent performance.

BRIEF DESCRIPTIONS OF THE DRAWINGS

DETAILED DESCRIPTION OF PREFERRED EMBODIMENTS

Figure 1:
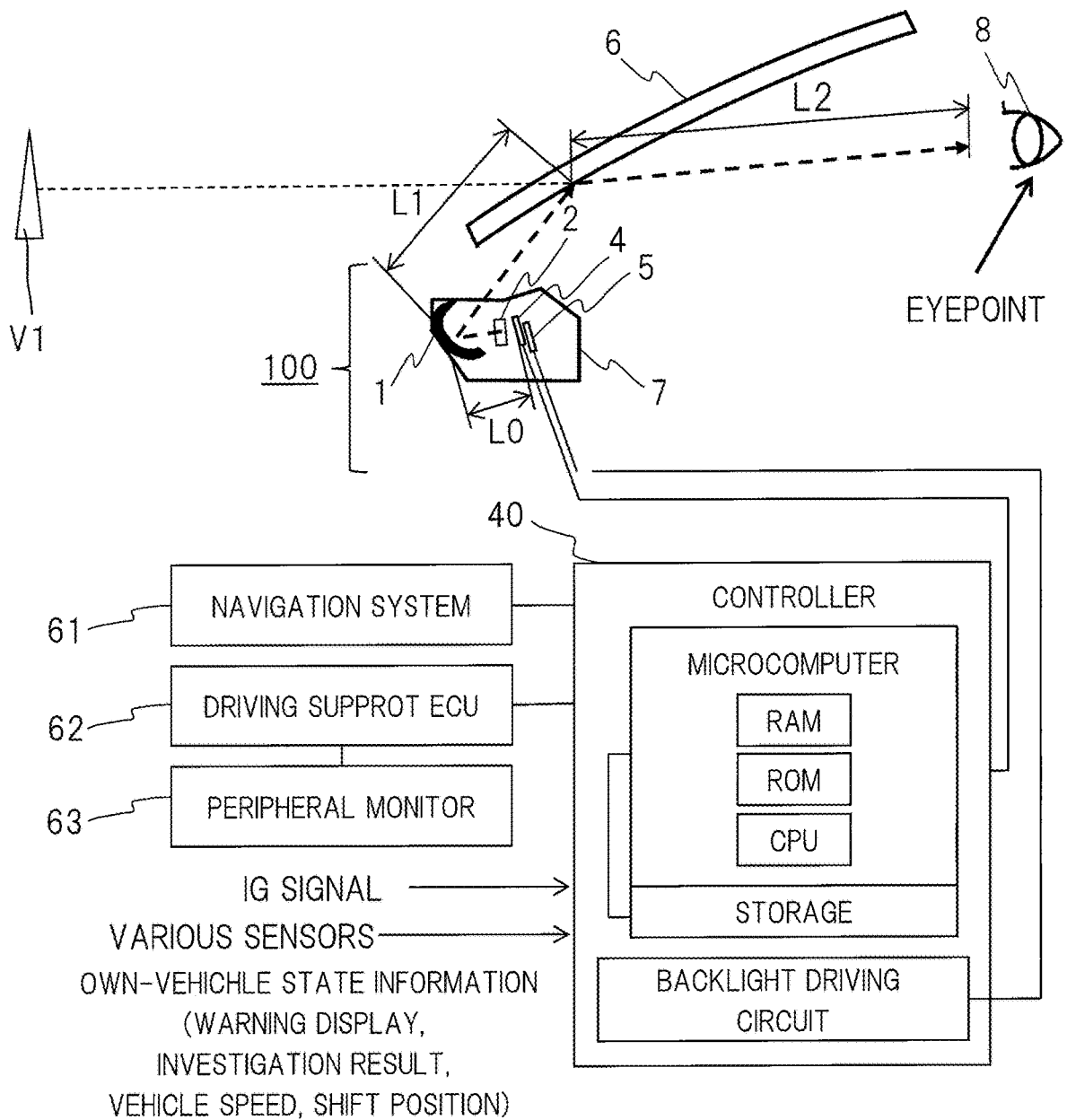
FIG. 1 is a schematic configuration diagram showing a peripheral equipment configuration of an information display apparatus according to an embodiment.

Hereinafter, embodiments of the present invention will be described in detail with reference to the accompanying drawings. Note that the present invention is not limited to the following description, and various changes and modifications can be made by those skilled in the art within a scope of the technical idea disclosed herein. Further, components having the same function are denoted by the same reference characters throughout the drawings for describing the embodiments, and the repetitive description thereof may be omitted.

<Outline of Information Display Apparatus>

FIG. 1 is a schematic configuration diagram showing a peripheral equipment configuration of an information display apparatus according to an embodiment of the present invention. Here, particularly explained as an example thereof will be an information display apparatus 100 projecting an image(s) onto a windshield of an automobile.

As shown in FIG. 1, the information display apparatus 100 is an apparatus (so-called HUD (Head up Display)) that displays, as a virtual image(s) VI, various pieces of information reflected by a projected member 6 (an inner surface of a windshield in this embodiment) in order to form the virtual image V1 in front of a driver's own vehicle and on (at) a driver's sightline (eye point detailed later) 8. Incidentally, the projected member 6 may be not only the above-mentioned windshield but also a combiner so long as being a member onto which information is projected. That is, the information display apparatus 100 according to the present embodiment may be a member so long as such a member forms a virtual image(s) in front of the own vehicle and on the driver's sightline 8 and causes the driver to visually recognize it. Of course, the information displayed as the virtual image includes, for example, vehicle information and foreground information photographed (captured) by a camera (not shown) such as a surveillance camera or an around viewer (around view camera).

Also, the information display apparatus 100 includes: a video-image display apparatus 4 that projects video-image light for displaying information; a correction lens 2 that corrects distortion and aberration caused in forming a virtual image(s) by a concave (free-form surface) mirror 1 from a video image(s) displayed in the video-image display apparatus; and an optical element (not shown) that is between the correction lens 2 and the video-image display apparatus 4 and prevents sunlight from returning to the video-image display apparatus 4 after the sunlight is condensed by the concave mirror 1.

Then, the information display apparatus 100 has a controller 40, which controls the above video-image display apparatus 4 and a backlight. Incidentally, optical components including the above video-image display apparatus 4, the backlight, and etc. are a virtual-image optical system described below, and include a concave mirror 1 for reflecting light. Also, the light reflected by those optical components is reflected by the projected member 6 and is directed to the sightline 8 of the driver.

Incidentally, used as the above video-image display apparatus 4 is, for example, a self-light-emitting VFD (Vacuum Fluorescent Display) or the like besides an LCD (Liquid Crystal Display) having a backlight.

Meanwhile, instead of the above video-image display apparatus 4, an image(s) may be displayed on a screen by a projector, formed as a virtual image(s) by the above concave mirror 1, and reflected by the windshield 6 or a combiner (not shown) serving as the projected member to be directed toward a visual point 8 of the driver.

Configured as such a screen may be, for example, a microlens array in which microlenses are two-dimensionally arranged.

Here, a shape of the concave mirror 1 in order to reduce distortion of the virtual image may have an upper portion (an area where light rays are reflected and which is below the windshield 6 having a relatively short distance from the visual point 8 of the driver) shown in FIG. 1, and a lower portion (an area where the light rays are reflected and which is above the windshield 6 having a relatively long distance from the visual point of the driver), the upper portion having a relatively small curvature radius so that an enlargement ratio increases, the lower portion having a relatively large curvature radius so that the enlargement ratio decreases. Additionally, inclination of the video-image display apparatus 4 to an optical axis of the concave mirror 1 makes it possible to realize further good correction also by correcting a difference between magnifications of the above-mentioned virtual images and reducing the distortion itself to be caused.

Figure 2:
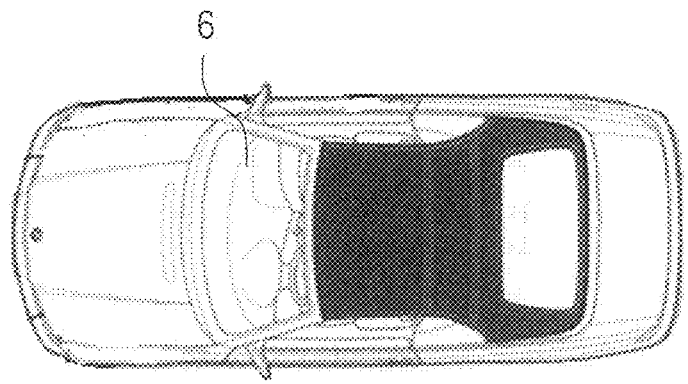
FIG. 2 is a top view of an automobile mounting the information display apparatus.
Figure 3:
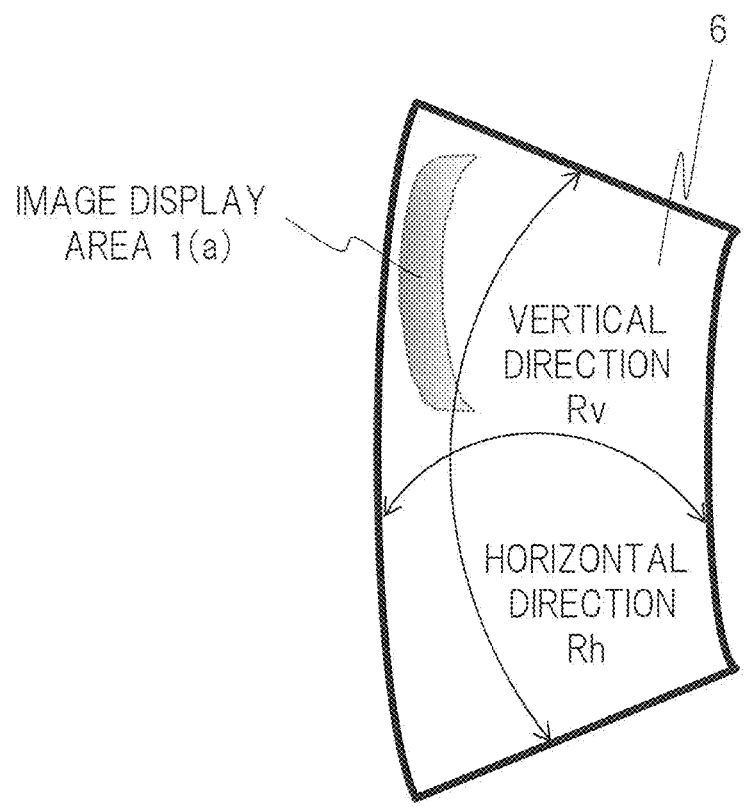
FIG. 3 is a diagram for explaining a difference in curvature radius of a windshield.

Meanwhile, as shown in FIGS. 2 and 3, the windshield 6 of the automobile differs in a curvature radius Rv in a vertical direction of a main body and a curvature radius Rh in a horizontal direction thereof, and generally has a relation of Rh>Rv. This makes the windshield 6 a toroidal surface of the concave mirror 1 if the windshield is considered as a reflection surface. Therefore, the shape of the concave mirror 1 in the information display apparatus 100 of the present embodiment may have an average curvature radius different from them in the horizontal and vertical directions so as to correct the magnificent of the virtual image due to the shape of the windshield 6, that is, so as to correct a difference between the vertical and horizontal curvature radii of the windshield 6. At this time, if being a spherical surface or aspherical surface (indicated by [Equation 2] described below) symmetrical to the optical axis, the shape of the concave mirror 1 has a function of a distance r from the optical axis. However, vertical and horizontal cross-sectional shapes at positions distant from each other in the concave mirror cannot be controlled individually, so that those shapes are preferably corrected as a function of coordinates (x, y) on a surface from an optical axis of a mirror surface serving as a free-form surface indicated by [Equation 1] described below.

$$Z = \frac{c \cdot (x^2 + y^2)}{1 + \sqrt{1 - (1+K)c^2 \cdot (x^2 + y^2)}} + \sum\sum (Cj(m,n) \times x^m \times y^n)$$

$$j = [(m+n)^2 + m + 3n]/2 + 1$$

[Equation 1]

$$Z = \frac{c \cdot h^2}{1 + \sqrt{1 - (1+K)c^2 \cdot h^2}} + A \times h^4 + B \times h^6 + C \times h^8 + D \times h^{10} + E \times h^{12} + F \times h^{14} + G \times h^{16} + H \times h^{18} + J \times h^{20}$$

[Equation 2]

Referring back to FIG. 1 again, for example, a lens element 2 is further disposed as a transmission type optical component between the video-image display apparatus 4 and the concave mirror 1, thereby controlling an emission direction of light rays toward the concave mirror 1 to correct the distortion and aberration along with the shape of the concave mirror 1 and simultaneously realize the aberration correction of the virtual image including astigmatism caused by the difference between the curvature radii in the horizontal and vertical directions of the above-mentioned windshield 6.

Also, in order to further enhance aberration correction capability, the above-mentioned lens element 2 may be composed of a plurality of lenses. Alternatively, control of a turning position on the light path and simultaneously an incident position of light onto the concave mirror 1 by disposing a curved (free-form) mirror instead of the lens element 2 also make it possible to reduce the distortion and aberration. As described above, even if an optical element optimally designed to improve the aberration correction capability is further provided between the concave mirror 1 and the video-image display apparatus 4, it is needless to say that such an optical element does not depart from a technical idea or scope of the present invention. Further, changing a thickness of the above-mentioned lens element 2 in a direction of the optical axis brings varying an optical distance between the concave mirror 1 and the video-image display apparatus 4 additionally to original aberration correction, thereby also making it possible to continuously change a display position of the virtual image from a distant position to a close position.

Additionally, a difference in the magnification of the virtual image in upper and lower directions may be corrected by aslant disposing the video-image display apparatus 4 with respect to an optical-axis normal of the concave mirror 1.

Further, an optical element (not shown), which reflects or absorbs the sunlight passing through the windshield and condensed by the concave mirror 1, is provided between the concave mirror 1 and the video-image display apparatus 4, thereby reducing an amount of light returning to the video-image display apparatus 4.

Meanwhile, a factor of deteriorating image quality of the information display apparatus 100 is that video-image light rays emitted from the video-image display apparatus 4 toward the concave mirror 1 are reflected on the surface of the lens element 2 disposed halfway therebetween, return to the video-image display apparatus 4, and are again reflected to be superimposed (overlapped) with the original video-image light. That is, the deterioration in the image quality has been known as such a factor. Consequently, the present embodiment is preferably designed as follows: an antireflection film is formed on the surface of the lens element 2 to suppress the reflection and, simultaneously therewith, either or both of video-image-light incidence and emission surfaces of the lens element 2 has a limitation of such a shape that reflected light as mentioned above is not condensed by a part of the video-image display apparatus 4 (for example, a shape having a concave surface that faces the video-image display apparatus 4).

Further, the inventors have considered characteristics of the antireflection film provided on the surface of the lens element 2. As a result, the following has been found through an experiment(s): reflectance in a green wavelength region having the highest visibility is kept (suppressed at) 0.2% or less, that in a red wavelength region is kept 0.6% or less, and that in a blue wavelength region is kept 1.0% or less, which has no influence on the image quality of the virtual image even if the sunlight is reflected on the surface of the optical element.

Meanwhile, if first and second polarizers are disposed as the video-image display apparatus 4, that is, if the first polarizer is disposed close to the liquid crystal panel and the second polarizer is disposed separately from the liquid crystal panel additionally to the first polarizer in order to absorb the reflected light from the above-mentioned lens element 2, the first and second polarizers can reduce the deterioration in the image quality. Simultaneously therewith, the sunlight passing through the windshield absorbs or reflects light condensed by the concave mirror 1 and incident on the liquid crystal panel, and reduces the light amount, thereby being capable of improving reliability of the liquid crystal panel.

Next, if the first and second polarizers are disposed as the video-image display apparatus 4, that is, if the first polarizer is disposed close to the liquid crystal panel and the second polarizer is disposed separately from the liquid crystal panel additionally to the first polarizer in order to absorb the reflected light from the above-mentioned lens element 2, the first and second polarizers can reduce the deterioration in the image quality. Further, backlight of the liquid crystal panel is controlled so that an incident direction of light incident on the liquid crystal panel is efficiently directed in a direction incident on an entrance pupil of the concave mirror 1. At this time, if a divergence angle of a beam (light flux) incident on the liquid crystal panel is made small in value, the video-image light is efficiently directed to the eye point of the driver and, simultaneously therewith, a video image with high contrast and high (good) visibility can be obtained. Contrast performance with respect to the divergence angle of the video image is remarkably changed in its horizontal direction, and if the divergence angle is within ±20 degrees, excellent characteristics thereof can be obtained. In order to further improve the contrast performance, a beam under the divergence angle within a range of ±10 degrees may be used.

Meanwhile, as the light source apparatus 10, a solid light source having a long product life is preferably adopted and, further, polarization conversion is preferably performed by using a PBS (polarizing beam splitter) as an LED (light emitting diode) whose light output change lessens with respect to a change in ambient temperature, the PBS being provided with an optical means for reducing a divergence angle of light.

Polarizers are arranged on a backlight side (light incidence surface) of the liquid crystal panel and on a lens element 2 side (light emission surface), thereby enhancing a contrast ratio of the video-image light. If an iodine-based polarizer having a high polarization degree is adopted as the polarizer provided on the backlight side (light incidence surface), a high contrast ratio can be obtained. Meanwhile, using a dye-based polarizer on the lens element 2 side (light emission surface) makes it possible to obtain high reliability even when external light is incident or when environmental temperature is high.

When the liquid crystal panel is used as the video-image display apparatus 4, particularly, when the driver wears polarized sunglasses, a specific polarized wave is blocked, which brings occurrence of a problem of the driver being unable to see the video image. In order to prevent this, a λ/4 plate is disposed on an optical element side of the polarizer disposed on the lens element side of the liquid crystal panel, thereby converting the video-image light aligned in a specific polarization direction into circularly polarized light preferably.

The controller 40 acquires, as foreground information (i.e., information to be displayed in front of the own vehicle by the above-mentioned virtual image) from a navigation system. 61, various pieces of information of: a speed limit and the number of lanes of a road corresponding to a current position where the own vehicle is traveling; a scheduled travel route of the own vehicle set in the navigation system 61; and the like.

A driving support ECU 62 is a controller for realizing driving support control by controlling a drive system and a control system in accordance with an obstacle (s) detected as a monitoring result (s) obtained from a periphery monitor 63. Included as the driving support control are, for example, well-known technologies such as cruise control, adaptive cruise control, pre-crash safety, and lane keeping assist.

The periphery monitor 63 is an apparatus for monitoring a situation around the own vehicle and includes, as an example, a camera for detecting an object(s) present around the own vehicle based on an image(s) obtained by photographing a periphery of the own vehicle; a surveying apparatus for detecting an object(s) present around the own vehicle based on a result(s) obtained from transmission and reception of a survey wave(s); or the like.

The controller 40 acquires, as foreground information, such information obtained from the driving support ECU 62 (for example, a distance to a preceding vehicle, a direction of the preceding vehicle, a position where an obstacle or sign is present, and the like). Further, inputted in the controller 40 are an ignition (IG) signal(s) and own-vehicle state information. The own-vehicle state information among these pieces of information is information acquired as vehicle information, for example, a remaining amount of fuel in an internal combustion engine or/and temperature of cooling water therein, or the like, and includes warning information indicating that the above information is an abnormal state previously defined. Additionally, the own-vehicle state information also includes an operation result(s) of a direction indicator, a traveling speed of the own vehicle, shift position information, and/or the like. The controller 40 described above is activated when an ignition signal is inputted. The foregoing is explanation about the overall system of the information display apparatus according to the present embodiment.

<Entry of Sunlight into Apparatus and Principle of its Suppression>

Next, explained will be entry of sunlight into the information display apparatus placed near the driver's seat of the vehicle.

Figure 4:
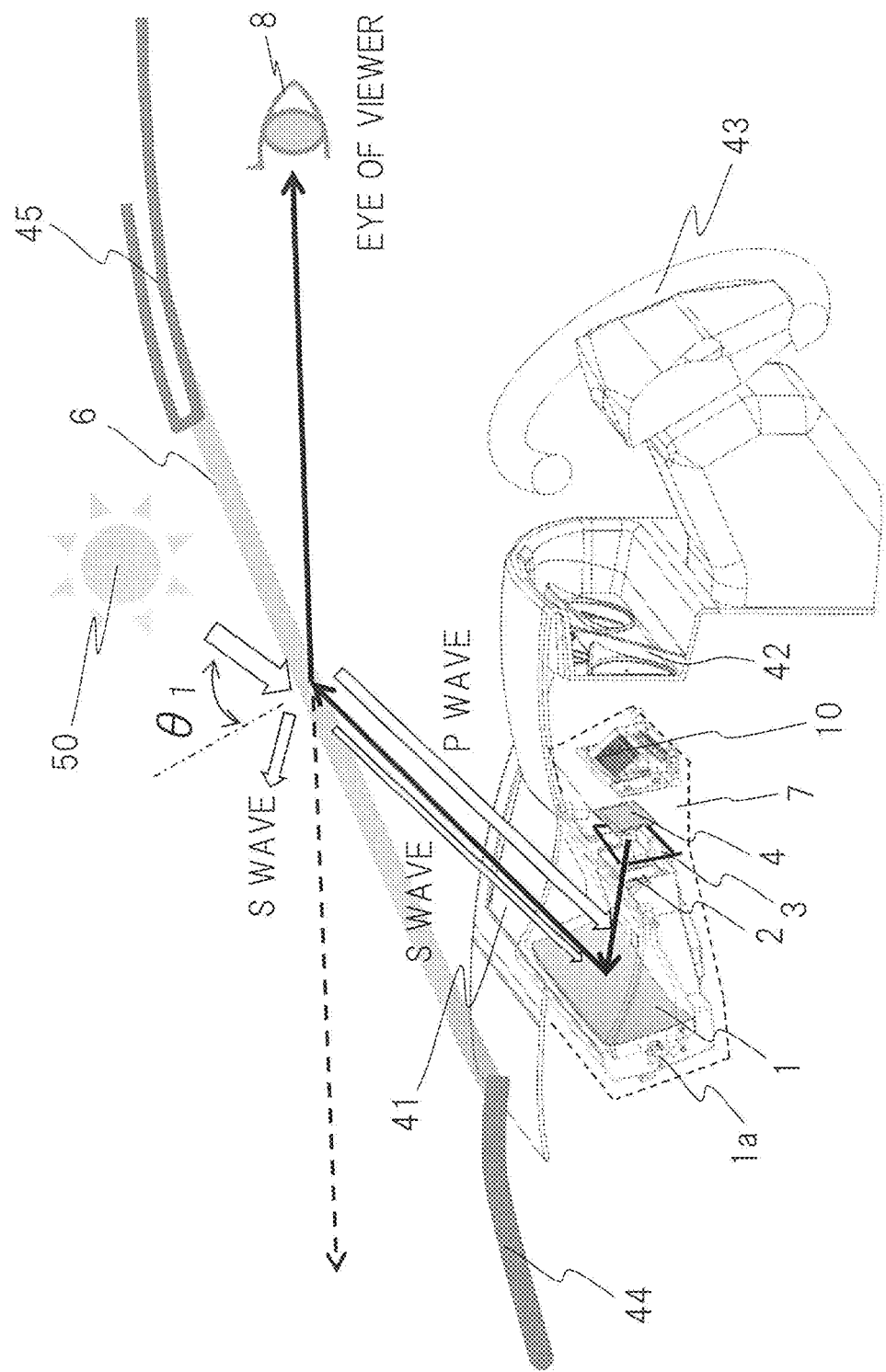
FIG. 4 is a schematic configuration diagram showing the information display apparatus, the windshield, and a position of a visual point of a driver.

FIG. 4 shows a state in the vicinity of the driver's seat of the vehicle, and the above-described information display apparatus 100 is disposed below the windshield 6 attached between a bonnet 44 and a ceiling plate 45 that constitute a vehicle body, for example, disposed on a back side (rear bonnet side) of a dashboard including an instrument such as a speedometer 42. Also, this figure shows a steering wheel 43 of the vehicle, an eye 8 of a viewer (observer) as the driver, and daytime sun 50 above the vehicle along with them. Further, FIG. 5 particularly shows the sun 50, windshield 6, and eye 8 of the viewer, which are extracted from the above state.

Figure 5:
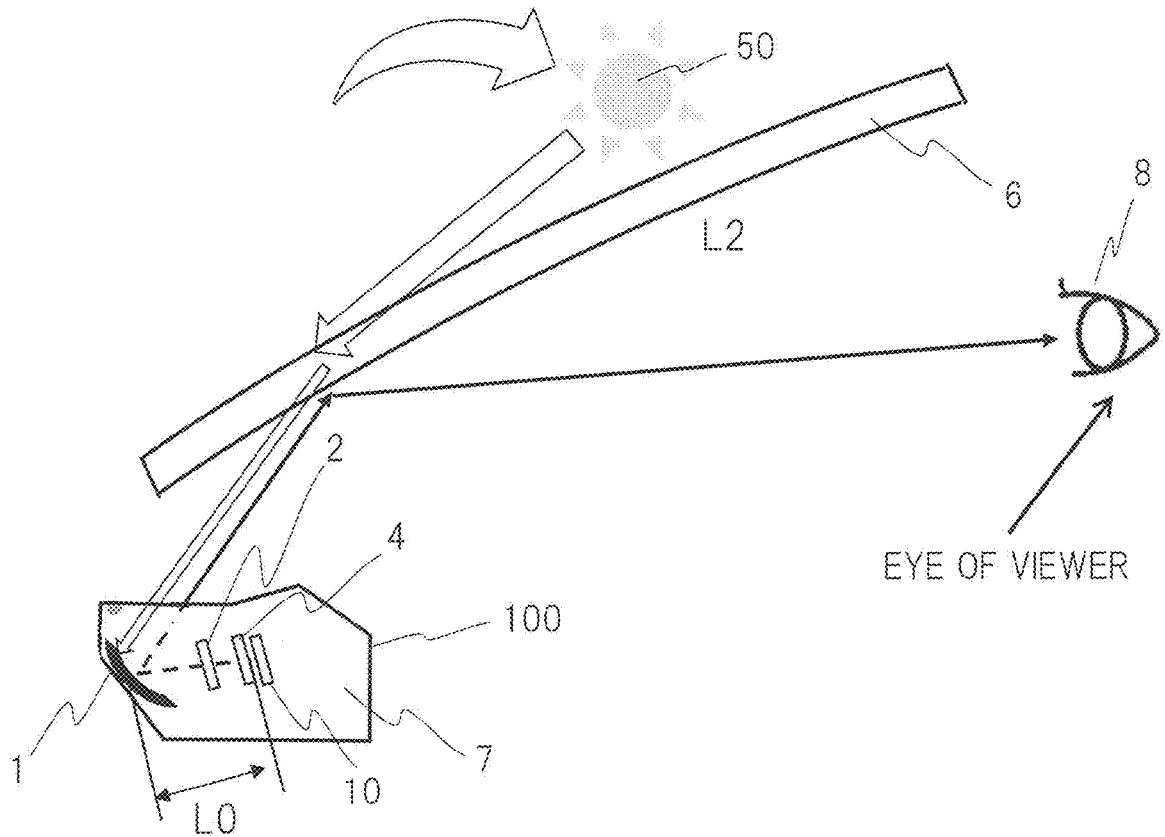
FIG. 5 is a schematic configuration diagram showing one example of the information display apparatus, the schematic configuration diagram being a light-ray diagram that shows a relationship between a virtual-image optical system of the information display apparatus according to the embodiment and sunlight.
Figure 6:
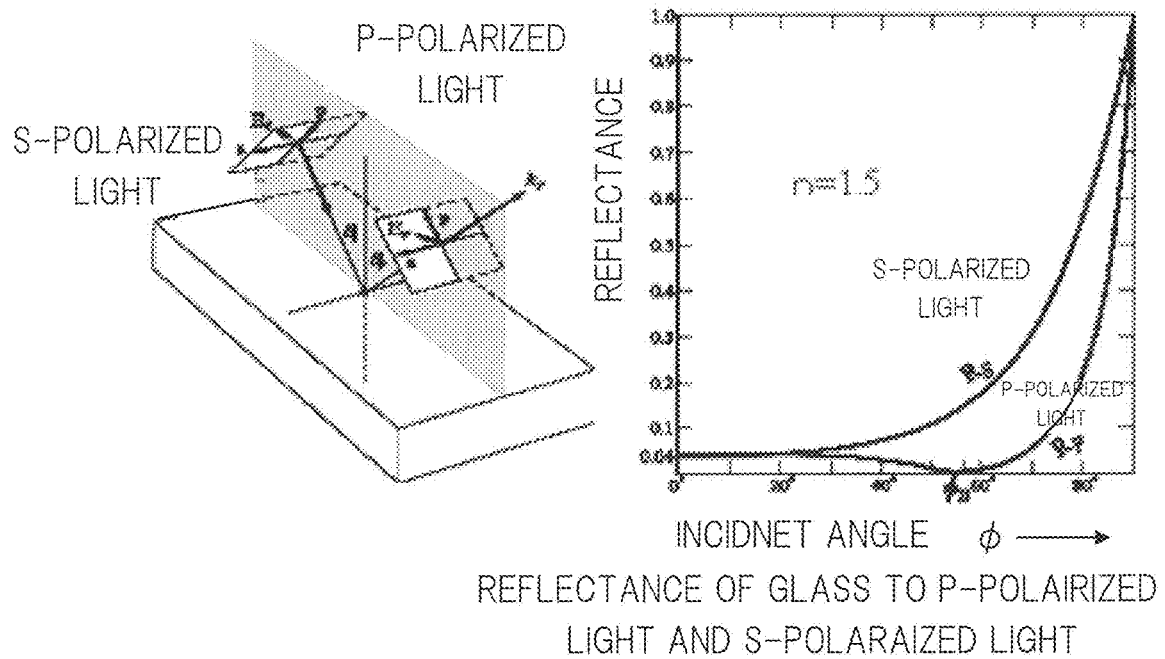
FIG. 6 is a schematic diagram for explaining a change in reflectance of glass with respect to incident angles due to S-polarization and P-polarization.

Strong light from the sun 50 is incident on the windshield 6 of the vehicle at an incident angle θ1 as shown by unshaded arrows in FIGS. 4 and 5. A part thereof is reflected by the windshield 6 and, thereafter, a remainder thereof passes an opening 41 provided at an upper portion of the information display apparatus 100, and enters an inside of the apparatus. Incidentally, as is apparent also from FIG. 5 at this time, most of an S-polarized light component (S wave) of sunlight as shown in FIG. 6 is reflected on the above-mentioned windshield 6, particularly, at an incident angle of 50 degrees or more. Consequently, most of the sunlight entering the inside of the information display apparatus 100 becomes a P-polarized light component (P wave).

On the other hand, the video-image light emitted from the information display apparatus 100 is reflected by the above-mentioned windshield 6 or combiner (not shown) as shown by solid arrows in FIGS. 4 and 5, thereby leading to being incident on the viewer's eye 8.

More specifically, natural light such as sunlight exists in a mixed state of P-polarized light and S-polarized light. As described above, in a region where the incident angle onto the windshield 6 exceeds 50 degrees, the reflectance on a glass surface differs depending on each of the S-polarized light and P-polarized light and, further, the incident angle as shown in FIG. 6.

Therefore, based on the above-described findings by the inventors, i.e., considering most of the sunlight entering through the windshield 6 being a P-polarized light component, what is confirmed in the present embodiment has been that a reduction in P-wave components is particularly effective for suppressing external light including the sunlight entering the inside of the information display apparatus 100 and, additionally thereto, use of S-wave components is effective as the video-image light projected from the information display apparatus 100.

<Concrete Example of Information Display Apparatus>

Subsequently, explained below will be a more concrete optical configuration of the information display apparatus 100 configured based on the above-described findings.

Figure 9:
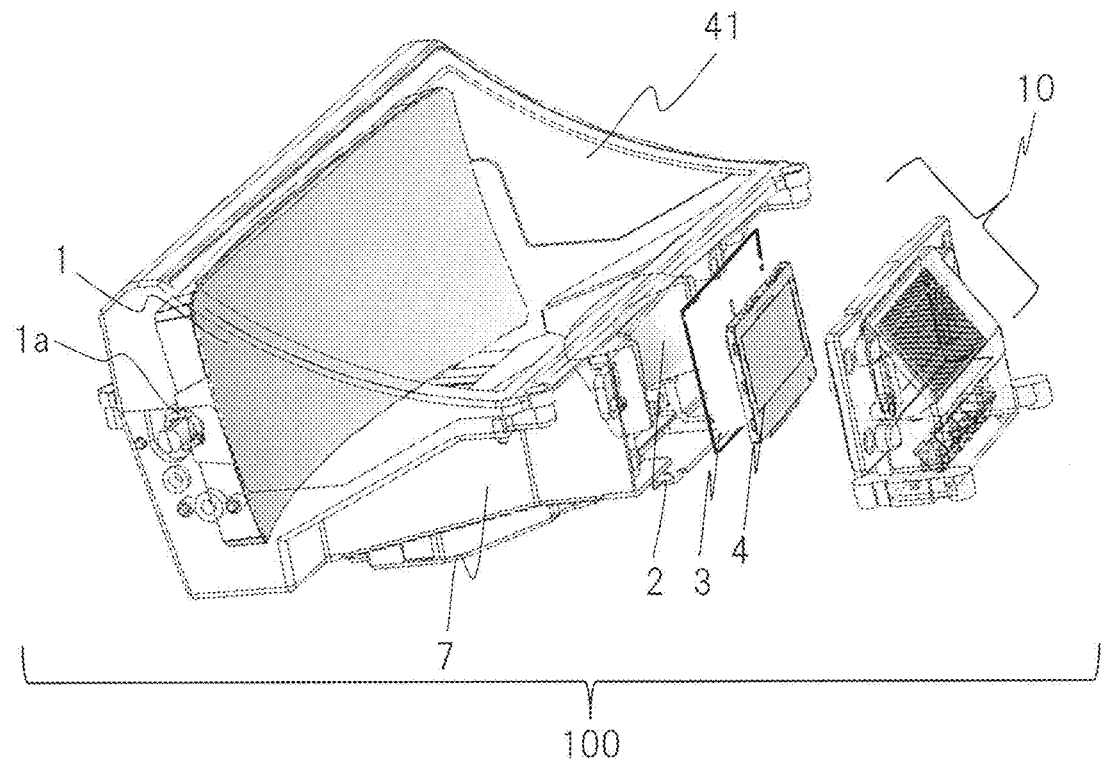
FIG. 9 is a schematic configuration diagram showing an example of the information display apparatus.

FIG. 9 shows the entire configuration of the information display apparatus 100. Provided in the information display apparatus in order from its downstream side are: the concave mirror 1 for projecting the video-image light forming the virtual image through the windshield 6; a correction lens element (lens group) 2 for correcting distortion and aberration caused in the projection; the video-image display apparatus 4; and a light source apparatus 10 configuring a backlight. Further, an optical means 3 for suppressing the P-wave component of the sunlight entering the inside of the information display apparatus 100 is provided, as an example for the suppression, between the lens element 2 and the video-image display apparatus 4.

First, in the present embodiment, the concave mirror 1 for projecting the video-image light preferably has a functions of reflecting visible light (wavelength: approximately 400 to 700 nm) and, simultaneously therewith, a function of particularly removing, from sunlight including various wavelength spectra, light rays that are unnecessary to and damage the information display apparatus, for example, infrared (IR) and ultraviolet (UV), etc. At this time, setting the reflectance of visible light at 95% or more makes it possible to realize a virtual-image optical system having high light utilization efficiency.

Contrarily, however, when viewing the concave mirror 1 directly through the windshield 6, the driver looks dazzling due to the reflection of external light. This brings: degradation of a grade of the automobile; and degradation of the image quality of the image (virtual image), which is obtained as the information display apparatus, such as contrast performance since strong light such as sunlight and headlights of oncoming vehicles in nighttime is reflected on the concave mirror 1 and its part returns to the liquid crystal panel. Such degradation leads to damaging the polarizer(s) and the liquid crystal panel. Therefore, if the reflectance of the concave mirror 1 is intentionally reduced to 90% or less, preferably 85% or less, the above-mentioned problems can be solved.

Figure 10:
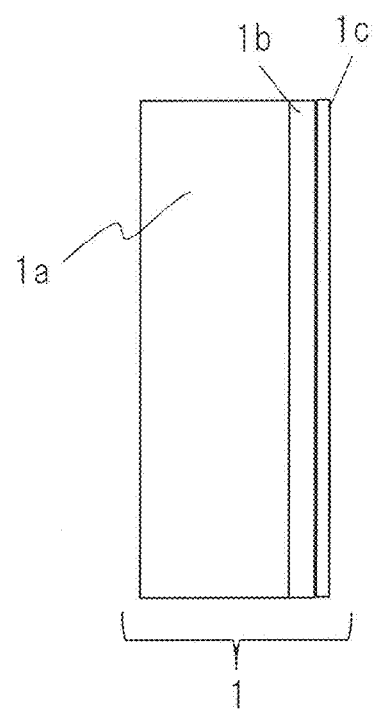
FIG. 10 is a schematic diagram showing a configuration of the concave mirror according to the embodiment.

In this embodiment, as shown also in FIG. 10, a surface of a base material 1a of the concave mirror 1 is provided with a reflection film 1b which transmits infrared rays and ultraviolet rays and reflects visible light (wavelength: approximately 400 to 700 nm), the base material 1a being made of plastic etc. The reflection film can improve scratch resistance by providing, on an air side of the reflection film, a protection film 1c for protecting the reflection film. The reflection film may be an optical multilayer film, and an inexpensive reflection film with high reflection characteristics can be obtained by providing a reflection enhancing film on a surface of an aluminum reflection film.

Figure 7:
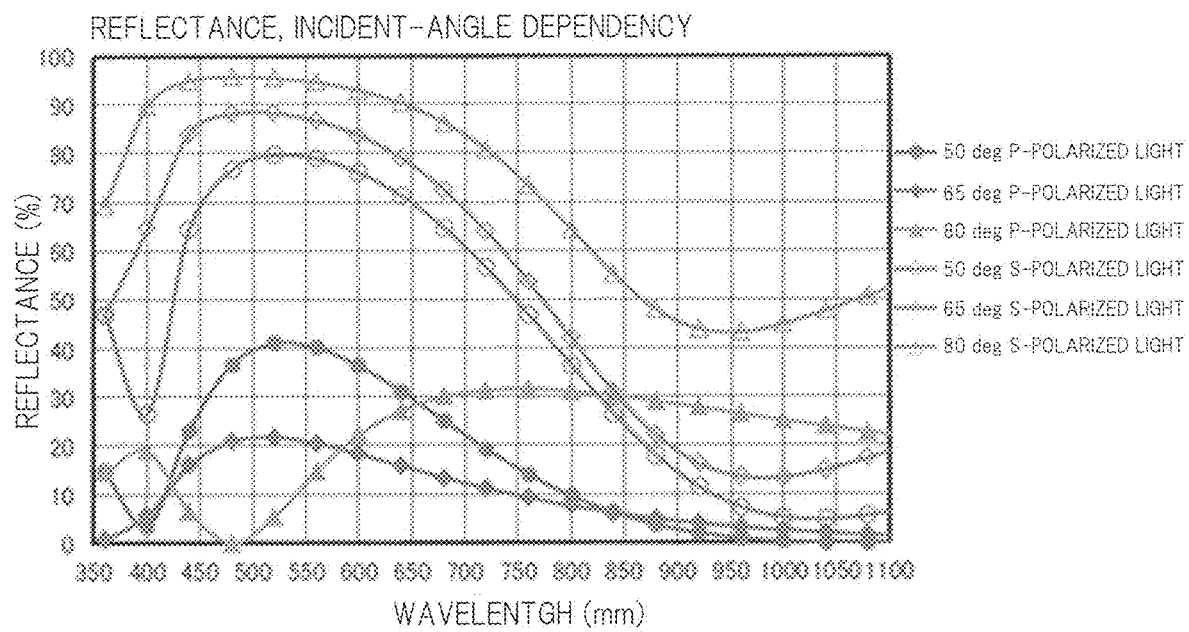
FIG. 7 is a diagram showing reflection characteristics of a concave mirror according to the embodiment.
Figure 7:
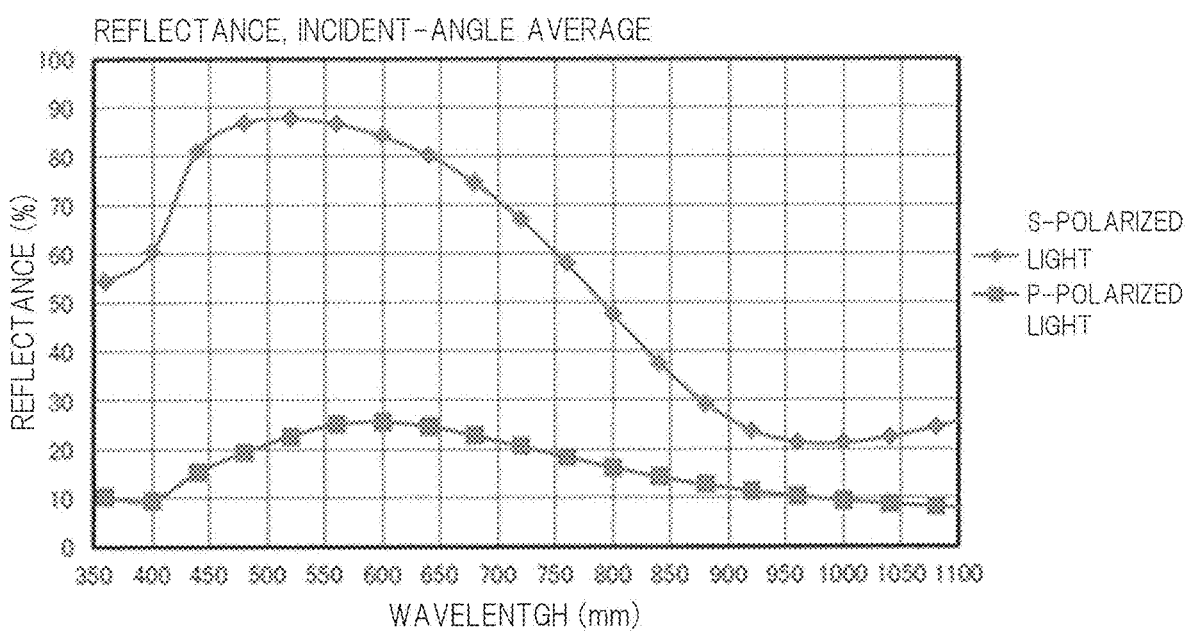

Reflection characteristics as shown in FIG. 7 by providing three reflection enhancing films can be obtained as characteristics of wavelength characteristic reflectance of the reflection film provided with the above-described reflection enhancing film. Regarding light having a large incident angle, reflectance of P-polarized light can also be reduced and, simultaneously, reflectance with respect to light in an ultraviolet region of 400 nm or less or in a near infrared region exceeding 700 nm can also be reduced.

Figure 8:
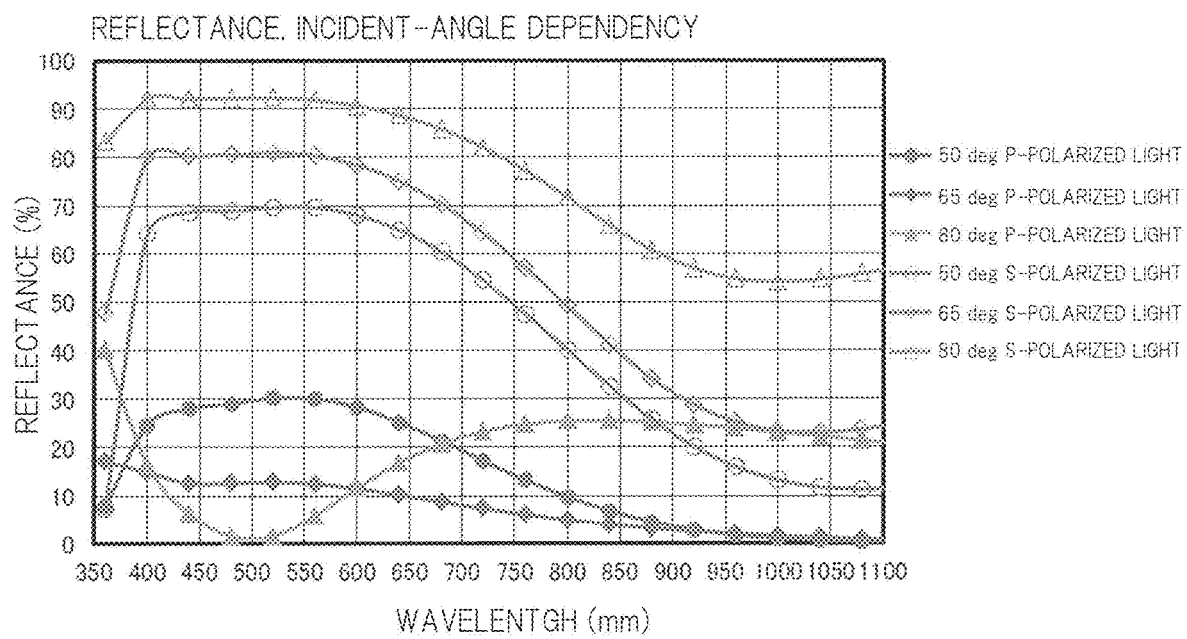
FIG. 8 is a diagram showing reflection characteristics of the concave mirror according to the embodiment.
Figure 8:
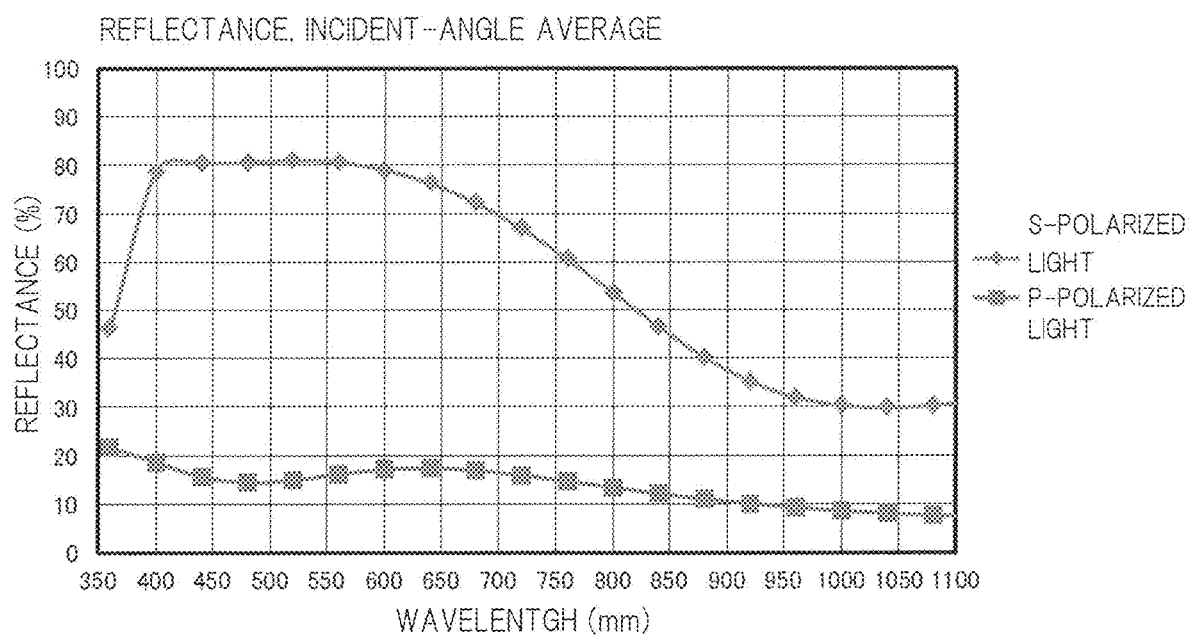

Further, reflection characteristics as shown in FIG. 8 can be obtained as characteristics of wavelength characteristic reflectance of a reflection film provided with five reflection enhancing films. Regarding light having a large incident angle, reflectance of P-polarized light can also be reduced, reflectance with respect to light in an ultraviolet region of 400 nm or less or in a near infrared region exceeding 700 nm can also be reduced simultaneously therewith, and reflectance characteristics in a visible-light (wavelength: approximately 400 to 700 nm) region can be made more flattened additionally thereto.

The base material 1a of the concave mirror is selected, the base material having such high transparency as not to absorb light having a wavelength component(s), which is not reflected, out of wavelength components of the above-mentioned sunlight. Included as a base material made of plastic and having high transparency are (1) ZEONEX manufactured by Nippon Zeon Co., (2) polycarbonate, and (3) acrylic, etc. ZEONEX in Item (1) is optimal since having an absorption rate of about 0% and highly thermal distortion temperature (thermal deformation temperature), but is expensive in price. Therefore, polycarbonate having thermal distortion temperature equivalent thereto and an absorption rate of about 0.2% may be contrived and used. Acrylic, which has the highest formability and is inexpensive, has the highest hygroscopicity (moisture absorptivity), so that providing a moisture-proof film and a reflection film thereto becomes essential.

Figure 11:
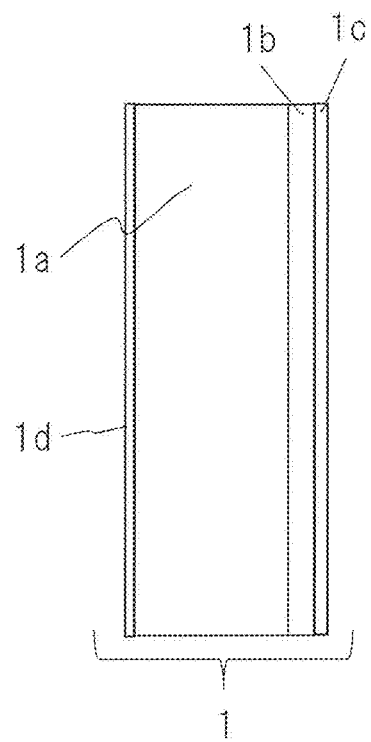
FIG. 11 is a schematic diagram showing a configuration of the concave mirror according to the embodiment.

In order to prevent the base material 1a of the concave mirror from absorbing moisture, as shown in FIG. 11, a reflection film to be formed on a reflection surface of the base material is provided and, additionally thereto, a moisture-proof film may be provided by forming a SiN (silicon nitride) film as a moisture-proof film 1d on an opposite side of the reflection surface. The SiN film as a moisture-proof film causes sunlight to pass, so that the base material causes no light absorption and can be prevented from being subjected to thermal deformation. Consequently, the concave mirror 1 formed of polycarbonate or acrylic can also prevent a shape change due to moisture absorption.

A holding portion (not shown) made of a material that absorbs light is formed on a back surface of the concave mirror shown in FIG. 11 so that the sunlight passing through the concave mirror 1 applying to the above-described technology is not scattered inside the information display apparatus. The holding portion may be caused to radiate heat of the concave mirror.

Further, although not shown here, a light-transmissive plate having a function of removing (cutting) infrared light and ultraviolet light may be provided to an opening 41 formed in an upper portion of the information display apparatus 100 in addition to or in place of the concave mirror 1 having a function of suppressing/removing the infrared light and ultraviolet light described above. Incidentally, in addition to the function of suppressing the infrared light and ultraviolet light, the light-transmissive plate can also have a function of preventing external dust from entering the inside of the information display apparatus 100 from outside.

Figure 12:
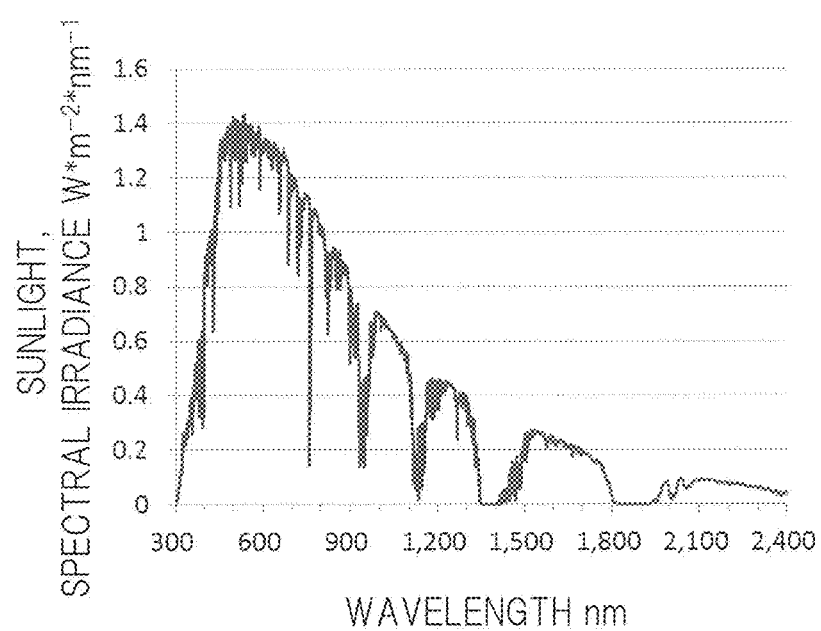
FIG. 12 is a characteristic diagram showing spectral irradiance (spectral irradiation illumination) of sunlight.

Thus, the above-mentioned concave mirror 1 make it possible to remove unnecessary components for the information display apparatus from the sunlight containing a large number of spectral components that enter the inside of the information display apparatus 100 from the opening 41, and to mainly selectively extract a visible light component(s) (see FIG. 12).

Subsequently, an example of the optical means 3 for suppressing the P-wave component of the sunlight mainly containing the above-mentioned visible light component will be explained with reference to FIGS. 13 and 14.

Figure 13:
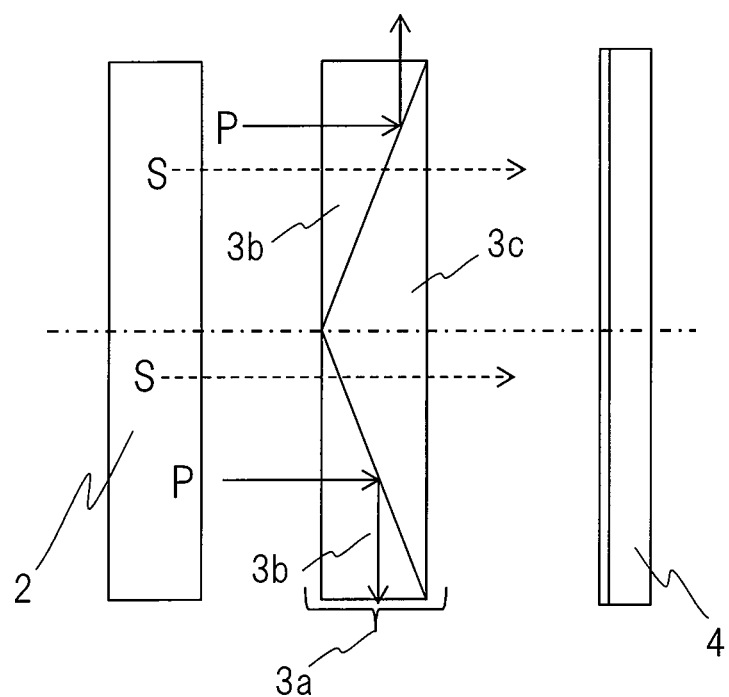
FIG. 13 is a diagram showing a configuration of an optical element according to the embodiment.

FIG. 13 shows an enlarged cross-section of an optical means 3a, and this optical means 3a is formed by joining two kinds of optical elements, i.e., an optical element 3c having an isosceles triangle cross-section and each optical element 3b having a right triangle cross-section, and each of their joint surfaces is provided with a PBS (Polarizing Beam Splitter). Consequently, as shown by arrows in the figure, the PBS has functions of transmitting the S-wave component of incident light and, simultaneously therewith, blocking (reflecting laterally) the P-wave component thereof.

Also, instead of the above configuration, an optical means 3f, whose entire configuration is shown in FIG. 14(a) and whose partially enlarged cross-section is shown in FIG. 14(b), is formed by providing, between two translucent (light transmissive) plate-like members 3fa, 3fa, two kinds of optical elements 3fb, 3fc each having a right triangle cross-section, and each of their joint surfaces is provided with a PBS having almost the same characteristics as those of an example shown by FIG. 13. Polarization separation performance that divides (separates) natural light into P-polarized light and S-polarized light is the highest when an inclined surface has an angle of 45 degrees with respect to the incident light rays, so that an apex angle of each cross-sectional shape of the above-mentioned optical elements may be 90 degrees.

Figure 14:
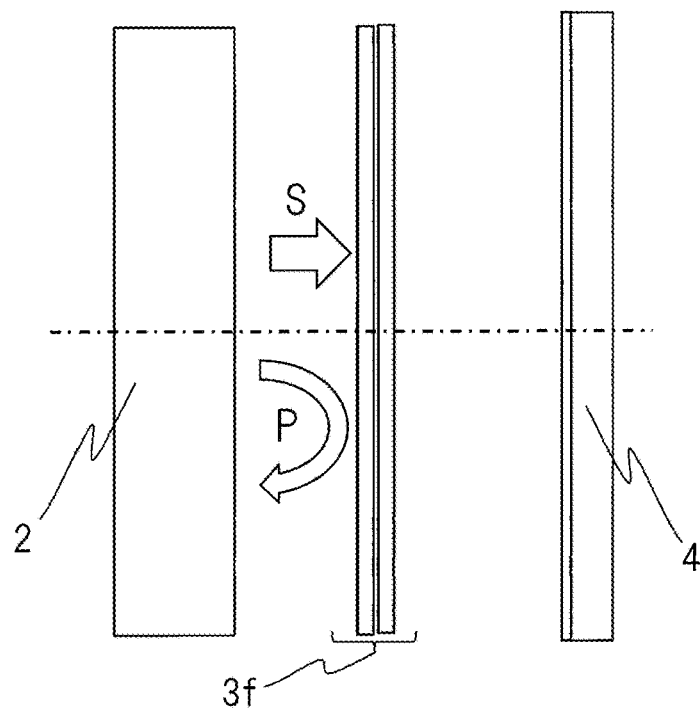
FIG. 14 is a conceptual diagram explaining a function of an optical element of a virtual-image optical system concerning an example.
Figure 14:
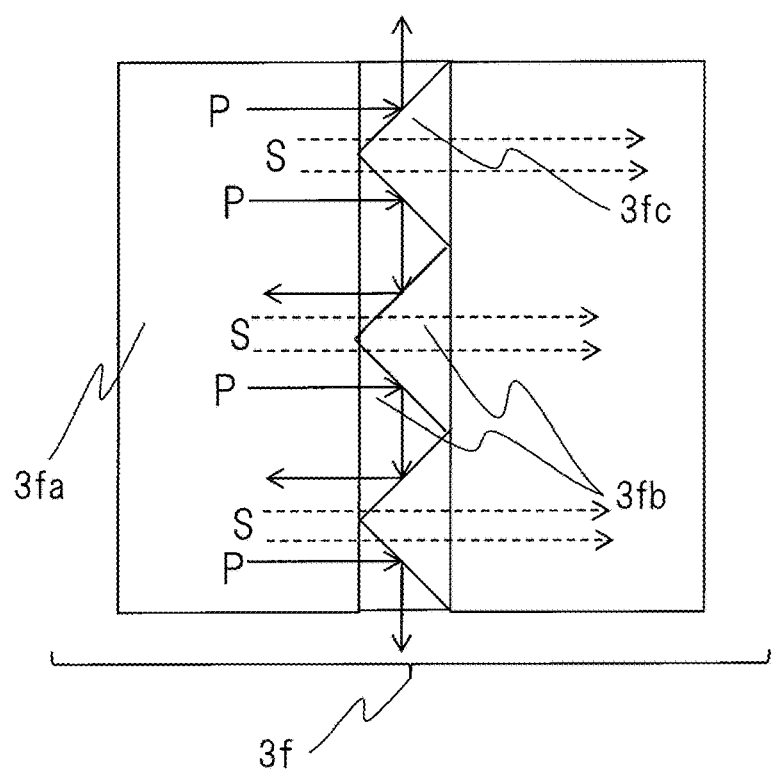

As another example of the optical means 3 for suppressing the P-wave component of the sunlight mainly containing the above-mentioned visible light component, an optical multilayer film is provided in place of each PBS provided in the optical means shown in FIGS. 13 and 14, and may obtain almost the same effects.

As described above, since the optical means 3 can transmit the S-wave component of the incident light and block the P-wave component, the optical member can also improve the contrast performance of the liquid crystal panel serving as the video-image display apparatus besides the suppression of the sunlight.

Figure 15:
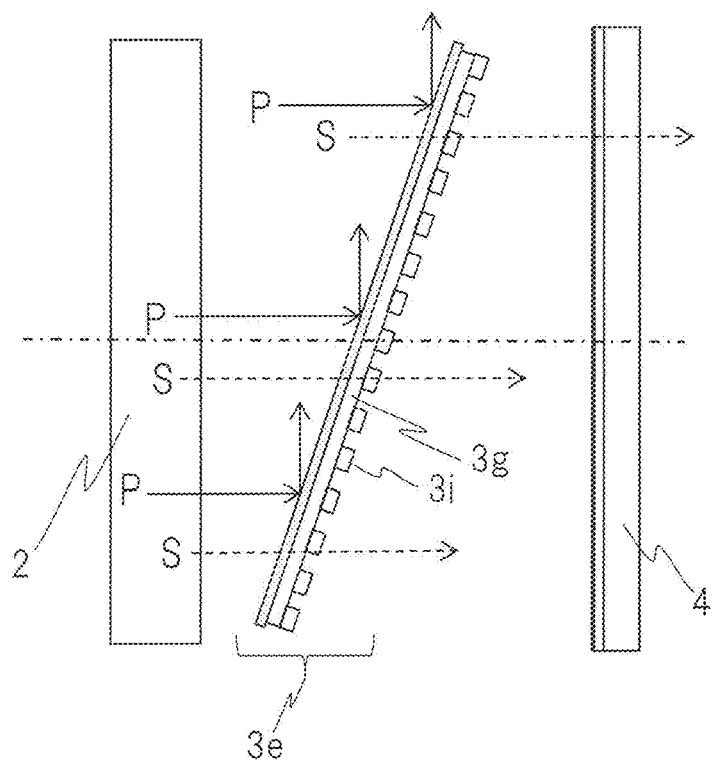
FIG. 15 is a conceptual diagram for explaining a function (operation) of an optical element of a virtual-image optical system according to the embodiment.

Additionally, FIG. 15 shows an optical means in which thin metal wires 3i are coated and formed in a lattice and on one surface of the translucent plate-like member 3g, i.e., an optical means using a so-called wire grid type polarizer 3e. Incidentally, the wire grid type polarizer 3e is aslant disposed only at a predetermined angle to the light as shown also in the figure, thereby causing the S-wave component of the incident light to be transmitted, the P-wave component to be simultaneously blocked (reflected laterally) similarly to the above, and the reflected light to be reflected to an outside of the reflection surface of the concave (free-form surface) mirror. That is, the wire grid type polarizer may be disposed so as to have no influence on optical performance of the information display apparatus.

Figure 27:
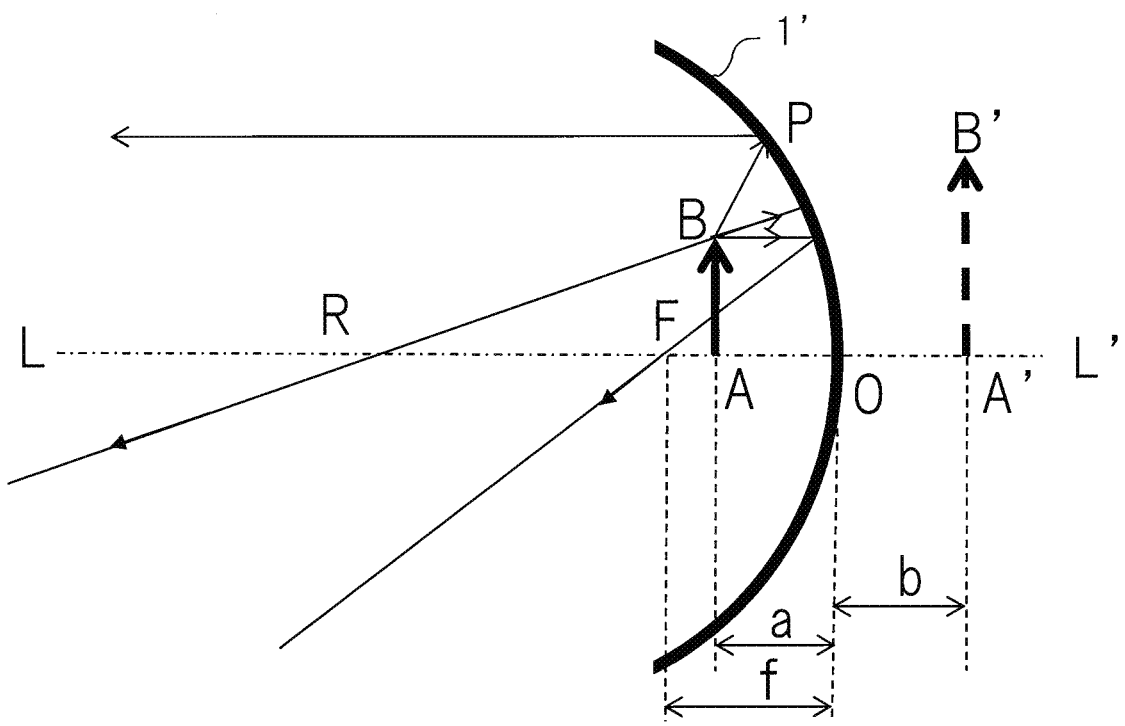
FIG. 27 is explanatory diagram showing the principle through which a virtual image is obtained from the concave mirror.

The virtual image produced by the concave mirror that realizes the HUD apparatus can be obtained as a virtual image(s) due to a concave mirror 1' by arranging an object point AB inside a focal point F (focal length f) with respect to a point O on an optical axis of the concave mirror 1' as illustrating the principle of its occurrence in FIG. 27. For convenience of explanation in FIG. 27, the concave mirror 1' is regarded as a convex lens having the same positive refractive power, and a relationship among the object point, the convex lens (expressed as the concave mirror for convenience of explanation in FIG. 27), and a virtual image(s) to be generated therefrom is illustrated.

When the driver views the virtual image generated by the HUD apparatus, the video-image display apparatus may be inclined to the video-image display apparatus (corresponding to AB in FIG. 27, a liquid crystal panel in the present embodiment) and an optical axis LL' of the concave (free-form surface) mirror in order to simultaneously ensure (secure) focus performance of a virtual image (image desired to be superimposed on a distant landscape) to be viewed by the driver after the reflection onto the upper portion of the windshield and focus performance of a virtual image (image desired to be superimposed on a near landscape) to be viewed by the driver after the reflection onto the lower portion of the windshield. This is also required for simultaneously satisfying a magnification of M=b/a of each of the virtual images generated by the liquid crystal panel and the concave (free-form surface) mirror.

Therefore, as described above, if being disposed in parallel to the video-image display apparatus, the optical means 3 (for example, a wire grid type polarizer) can return the P waves and unnecessary sunlight to the concave mirror without impairing polarization characteristics, so that the image quality of the video image (virtual image) of the information display apparatus is not degraded.

Figure 16:
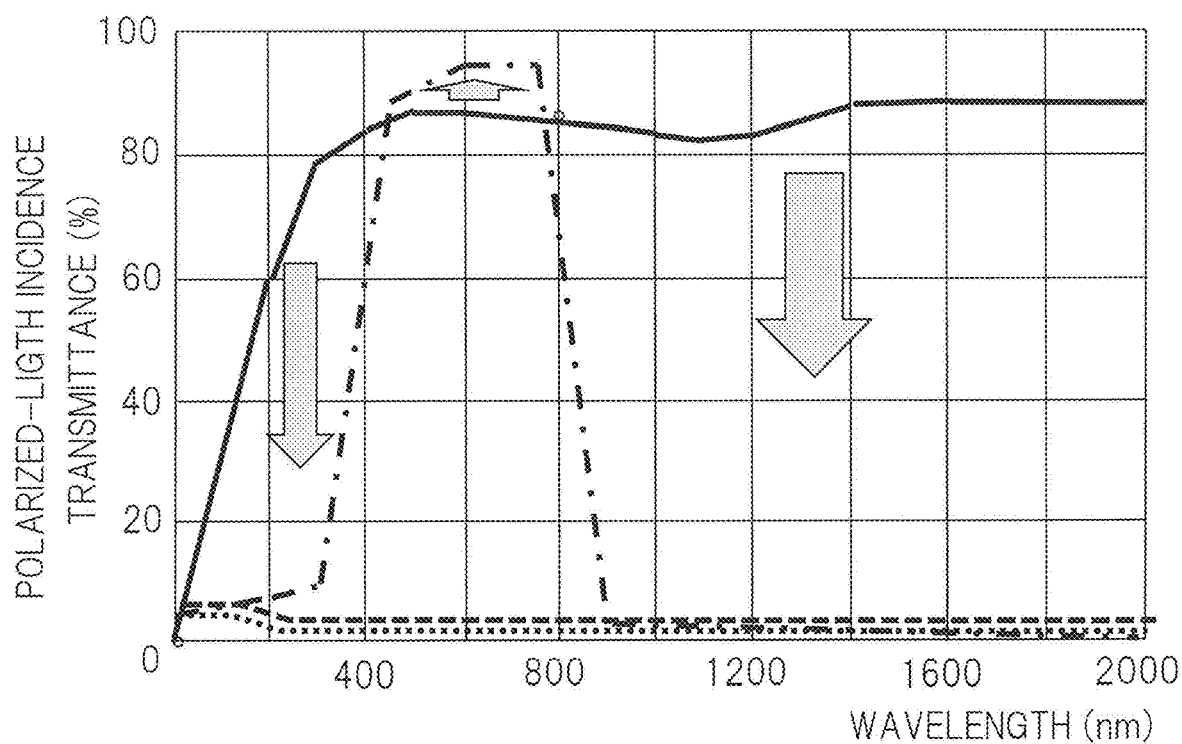
FIG. 16 is a diagram showing transmittance characteristics with respect to polarized waves of the optical element.

FIG. 16 shows an example of transmittance to incident light, the transmittance being obtained by the above-mentioned optical means 3e. Incidentally, a solid curve in this graph indicates transmittance of S-polarized light of a wire grid type polarizer in a conventional technique. Also, a broken line indicates transmittance of P-polarized light. The inventors of the present invention can obtain high (a large-gap) light shielding characteristics in the ultraviolet (UV) region and the near infrared (IR) region by using, as an optical means, a polarizer of polarization characteristics having S-polarized light's transmittance characteristics as indicated by a dash-single-dot line with respect to conventional characteristics and can sufficiently suppress the P-wave component selectively from the components of the sunlight mainly containing the visible-light component by using, as an optical means, a polarizer having P-polarized light's transmittance characteristics as indicated by a broken line.

Besides the above-described P-wave-component reflecting optical means as the optical means 3, a polarizing means that absorbs P-polarized light is provided, thereby making it possible to obtain almost the same effect by absorbing the P-polarized component of the sunlight. At this time, a reflection film for blocking ultraviolet rays and near infrared rays is provided on a sunlight-incident side of a substrate that holds and fixes the polarizer, so that energy of ultraviolet rays and near infrared rays incident on a subsequent polarizer and liquid crystal panel is lowered and, needless to say, damages to them can be reduced. The video image on the liquid crystal panel as the video-image display apparatus is obtained by a multiplication of a polarization degree of a first polarizer attached to the liquid crystal panel and a polarization degree of an absorption polarizer of the optical means 3, so that a high contrast video image with a high polarization degree can be obtained.

Further, as is apparent also from the above-mentioned figures, the above-mentioned optical means 3 (3a, 3e) can be configured so that its outer shape is plate-like, i.e., has a so-called filter shape. This is advantageous to a configuration necessary for realizing miniaturization of the information display apparatus 100, that is, also to a virtual-image optical system in which a distance (optical axis) Z after the video image displayed by the video-image display apparatus 4 is directly expanded by the concave mirror 1 is short as shown also in FIGS. 4, 5, and 9 since the optical means is easily disposed in a narrow light-path space within the information display apparatus 100. Particularly, for example, a space between the above-mentioned lens element 2 and video-image display apparatus 4 makes it possible to lessen an area(s) of the optical means 3 arranged thereon, which may be advantage price-wise.

An optical configuration of the above-mentioned information display apparatus 100 removes unnecessary IR and UV from the sunlight entering the inside of the apparatus through the windshield 6, and the above-mentioned optical means 3 effectively reduces the P-wave component (p-polarized wave) among the components of the sunlight that passes through the upper opening 41, enters the inside of the information display apparatus 100, and has an adverse effect such as yellowing carbonation on the video-image display apparatus 4 and the peripheral polarizer, etc. disposed therein. That is, the optical means makes it possible to reduce the damages to the liquid crystal display element and the polarizer due to the sunlight, and to suppress (control) deterioration in performance of the information display apparatus 100 due to the sunlight.

<Light Source Apparatus in Video-Image Display Apparatus>

As described above, in the optical system of the information display apparatus 100, the sunlight entering (incident on) the apparatus through the windshield 6 from outside is reduced by the above-mentioned optical means 3 and, simultaneously therewith, the video-image light for generating the virtual images of various pieces of video-image information to be displayed in front of the own vehicle is projected from the information display apparatus 100 and reaches the windshield 6 through the lens element 2 and the concave mirror 1 as shown by the solid arrows in FIGS. 4 and 5. Incidentally, also in this case, the video-image light passes through the optical means 3, but the S-wave component (s-polarized wave) is used for the video-image light as described above.

Therefore, detailed below will be examples of a video-image display apparatus 4 for generating video-image light of the S-wave component and its light source apparatus 10.

Figure 17:
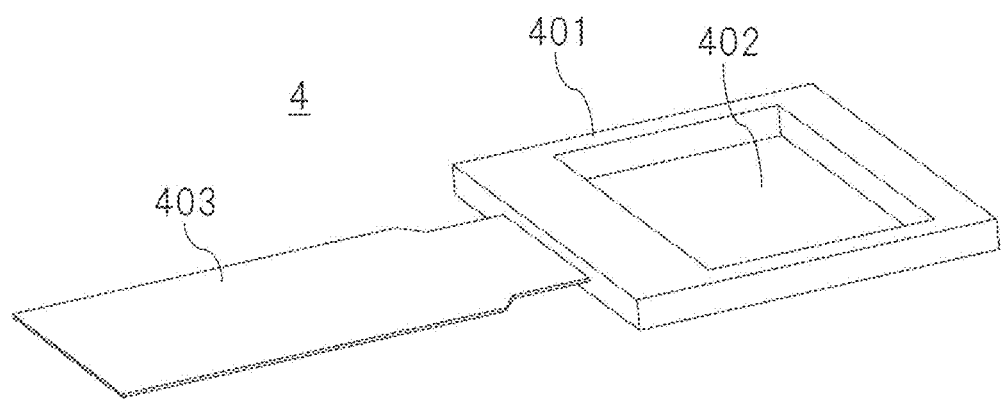
FIG. 17 is a configuration diagram showing arrangement of a video-image display apparatus and a light source apparatus.
Figure 17:
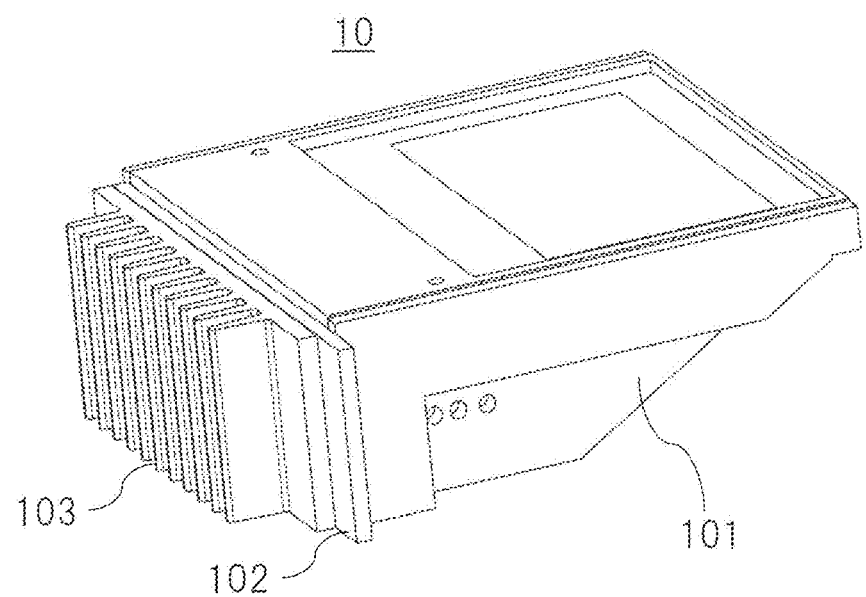

FIG. 17 shows, through a development perspective view, a liquid crystal display element serving as the above-mentioned video-image display apparatus 4, and a light source apparatus 10 configuring its light source.

The light source apparatus 10 is formed of, for example, plastic etc., and is configure by a light-source-apparatus case 101 housing (accommodating) therein an LED, a collimator, an optical composite block, and a light guide, etc., which will be detailed later. Attached to its upper surface is the above-mentioned liquid crystal display element serving as the video-image display apparatus 4. Also, an LED (Light Emitting Diode) element serving as a semiconductor light source, and an LED substrate 12 mounting its control circuit are attached to one side surface of the light-source-apparatus case 101, and a heat sink 103 for cooling heat generated by the above-mentioned LED element and control circuit is attached to an outer surface of the LED substrate 102.

On the other hand, the liquid crystal display element serving as the video-image display apparatus 4 and attached to the upper surface of the light-source-apparatus case 11 is configured by: a liquid crystal display panel frame 401; a liquid crystal display panel 402 attached to the frame; a FPC (Flexible Printed Circuits: flexible wiring board) 403 electrically connected to the panel. That is, although detailed later, the liquid crystal display panel 402 generates a video image (s) displayed by a control signal (s) sent from a control circuit (not shown here) constituting an electronic apparatus (s) together with the LED element serving as a solid light source.

Subsequently, detailed with reference to the drawings will be an internal configuration of the above-mentioned light source apparatus 10, that is, an optical system housed in the light-source-apparatus case 101.

Figure 18:
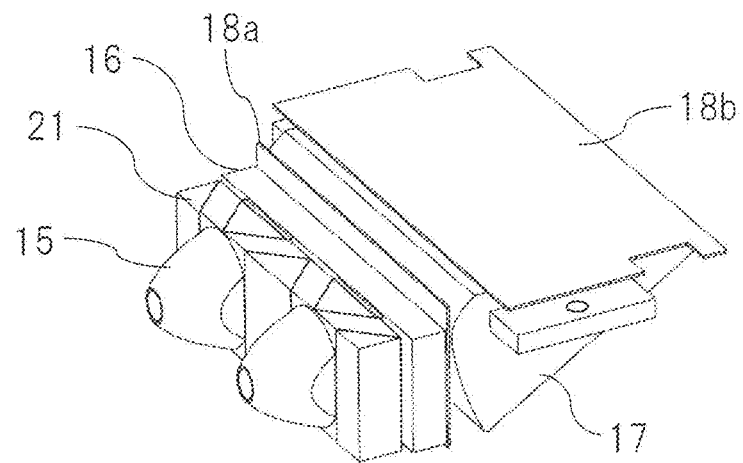
FIG. 18 is a schematic configuration diagram showing a configuration of the light source apparatus.
Figure 19:
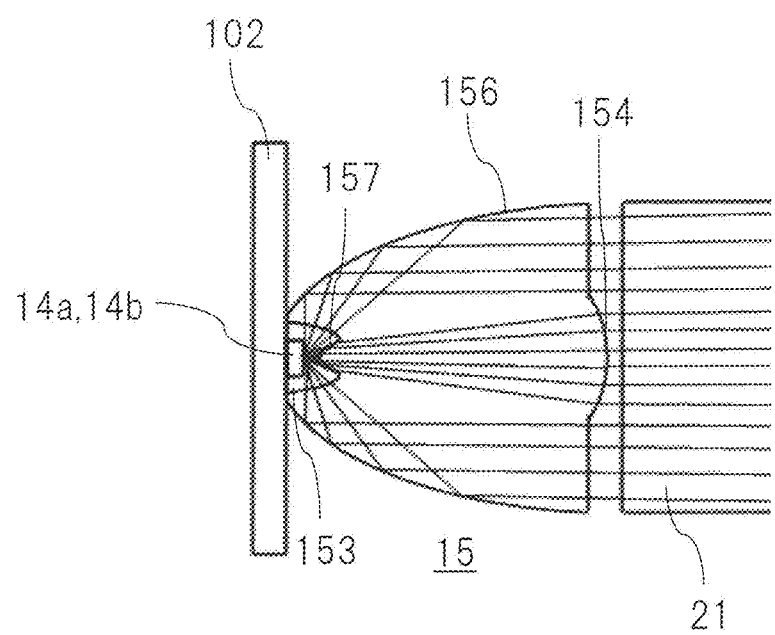
FIG. 19 is a schematic configuration diagram showing a cross-sectional shape of an optical element which controls a direction of light propagating toward a light guide of the light source apparatus.

FIG. 18 shows a plurality of (two in this embodiment) LEDs 14a, 14b (not shown here) constituting a light source, and these are attached at predetermined positions with respect to LED collimators 15. Incidentally, those LED collimators 15 are each formed of, for example, a translucent resin such as acrylic. Then, as shown also in FIG. 19, the LED collimator 15 has: a conic, convex-shaped outer peripheral surface 156 obtained by rotating a substantially parabolic cross-section; and a concave portion 153 whose center portion is formed in a convex shape (i.e., convex lens surface) 157 at its apex portion. Further, a center portion of its flat (planar) portion has a convex lens surface (or a concave lens surface concaved inward) 154 protruding outside. Incidentally, a parabolic surface 156 forming the conic, outer peripheral surface of the LED collimator 15 is set within a range of angles capable of totally reflecting therein the light emitted in a peripheral direction from the LED 14a, or has a reflection surface formed therein.

On the other hand, the LEDs 14a, 14b are each disposed at predetermined positions on a surface of their control substrate, a so-called LED substrate 102. The LED substrate 102 is disposed and fixed to the LED collimator 15 so that the LED 14a or 14b on its surface is located (positioned) at a center portion of its concave portion 153.

According to this configuration, by the above-described LED collimator 15, some light rays particularly radiated upward (rightward in the figure) from a center portion thereof out of light rays emitted from the LED 14a or 14b are condensed and made parallel light rays by two convex lens surfaces 157, 154 forming an outer shape of the collimator 15. Further, the other light rays emitted toward a peripheral direction from the other portion thereof are reflected by the paraboloid surface forming the conic, outer peripheral surface of the LED collimator 15, and are similarly condensed and made parallel light rays. In other words, the LED collimator 15 whose center portion configures a convex lens and whose peripheral portion forms a parabolic surface makes it possible to take out, as parallel light rays, substantially all of the light rays generated by the LED 14a or 14b, thereby being capable of improving utilization efficiency of the generated light rays.

Figure 20:
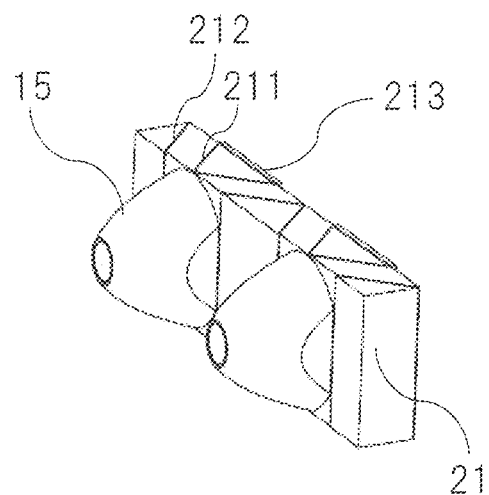
FIG. 20 is a schematic configuration diagram showing a shape of a polarization conversion portion of the light source apparatus.

Incidentally, a light emission side of the LED collimator 15 is provided with a polarization conversion element 21 detailed below. As shown also in FIG. 20, the polarization conversion element 21 is configured by combining: a columnar (hereinafter, parallelogram pillar) translucent member whose cross-section is a parallelogram; and a columnar (hereinafter triangular prism) translucent member whose cross-section is a triangle, a plurality of translucent members as mentioned above being arranged in an array and in parallel to a surface orthogonal to an optical axis of the parallel light rays from the LED collimator 15. Further, polarization beam splitter (abbreviated as "PBS" hereinafter) films 211 and reflection films 212 are alternately provided at an interface between the adjacent translucent members arranged in the array, and a half wave plate (½ λ phase plate) 213 is equipped with an emission surface from which the light incident on the polarization conversion element 21 and transmitting the PBS film 211 is emitted.

Figure 21:
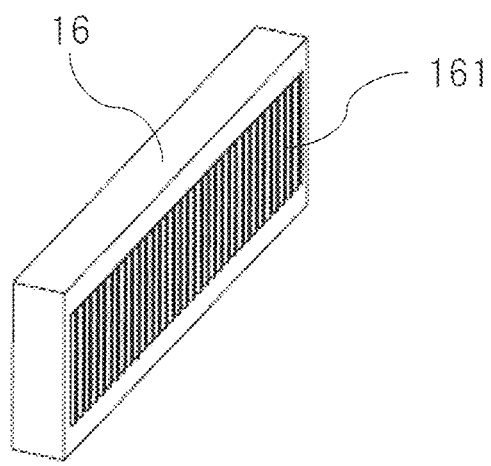
FIG. 21 is a schematic diagram showing a configuration of an optical composite block according to the embodiment.

Further, an emission surface of the polarization conversion element 21 is provided with a rectangular optical composite block 16 shown also in FIG. 21. That is, the light emitted from the LED 14a or 14b is made (converted into) parallel light by a function (action) of the LED collimator 15, is diffused by a texture 161 on an emission side, and then reaches alight guide 17 described below.

Here, returning to FIG. 18 again, a prism-shaped light guide 17 having a substantially triangular cross-section is provided on an emission surface side of the optical composite block 16 via a first diffuser 18a, and a second diffuser 18b is attached to its upper surface. This causes horizontal light of the collimator 15 to be reflected upward in the figure by the function of the light guide 17 and to be guided to an incidence surface of the above-mentioned liquid crystal display element. Incidentally, at this time, an intensity of the incident light is made uniform by the first and second diffusers 18a, 18b.

Hereinafter explained with reference to the drawings will be details of the above-mentioned light guide 17. Incidentally, FIG. 22(a) is a perspective view showing the entirety of the light guide 17, FIG. 22(b) is a cross-section thereof, and each of FIGS. 22(c) and 22(d) is a partially expanded sectional view showing details of the cross-section.

Figure 22:
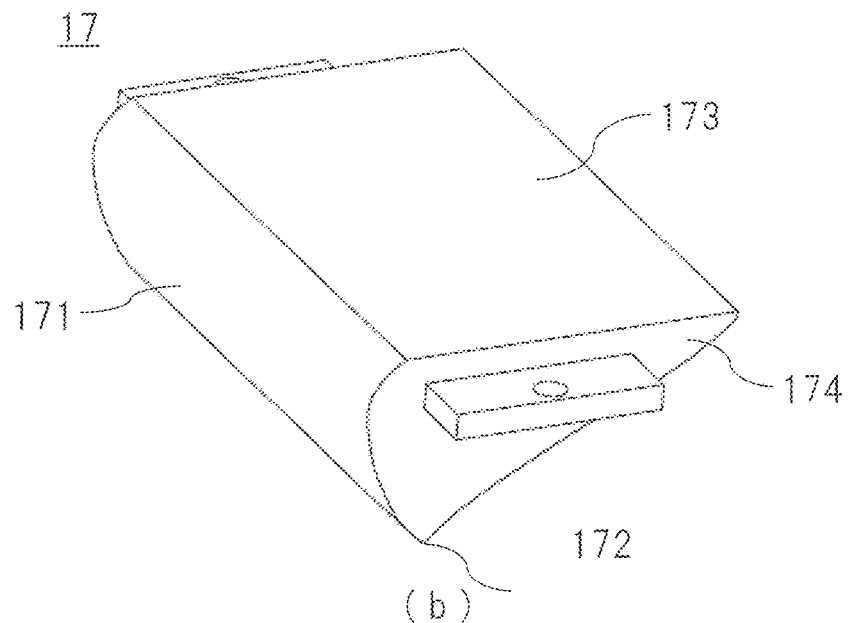
FIG. 22 is a configuration diagram showing a configuration of a light guide of the light source apparatus according to the embodiment.
Figure 22:
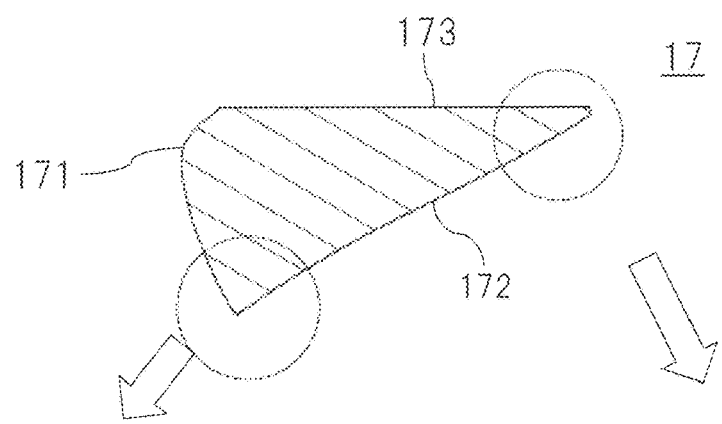
Figure 22:
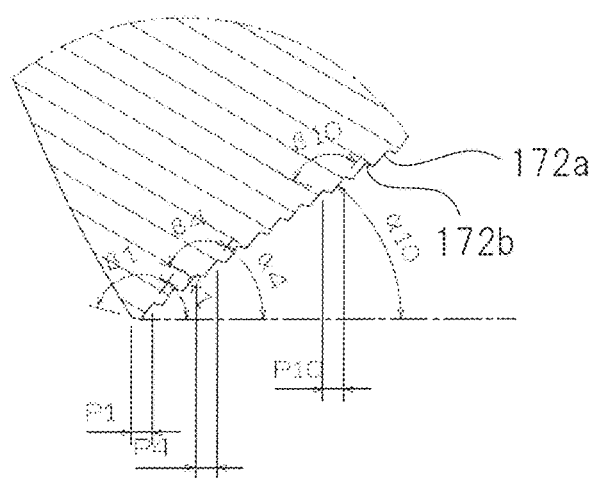
Figure 22:
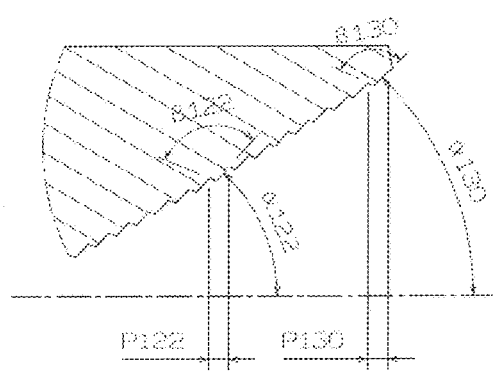

The light guide 17 is, for example, a member made of a translucent resin such as acrylic and formed in a bar (rod, stick, pole) shape having a substantially triangular cross-section (see FIG. 22(b)). Then, as is apparent also from FIG. 22(a), the light guide 17 includes: a light-guide light-incidence portion (surface) 171 facing (opposing) the emission surface of the above-mentioned optical composite block 16 via the first diffuser 18a; a light-guide light-reflection portion (surface) 172 forming an inclined surface; and a light-guide light-emission portion (surface) 173 facing a liquid crystal display panel 402 of the above-mentioned liquid crystal display element via the second diffuser 18b.

As shown in FIGS. 22(c) and 22(d) which are partially enlarged views of the light guide, a large number of reflection surfaces 172a and a number of connection surfaces 172b are alternately formed in serrate shapes on (in) the light-guide light-reflection portion (surface) 172 of the light guide 17. Then, the reflection surface 172a (line segment rising rightward in the figure) forms an angle $\alpha n$ (n: natural number, for example, 1 to 130 in this example) with respect to a horizontal plane indicated by a dash-single-dot line in the figure. Here, $\alpha n$ is set to 43 degrees or less (however, 0 degrees or more) as its one example.

On the other hand, the connection surface 172b (line segment falling rightward in the figure) forms an angle $\beta n$ (n: natural number, for example, 1 to 130 in this example) with respect to the reflection surface. That is, the connection surface 172b of the reflection portion is inclined to the incident light at such an angle as to be shadowed in a range of a half value angle of a scatterer described also later. Although detailed also later, $\alpha 1$, $\alpha 2$, $\alpha 3$, $\alpha 4$ . . . form a reflection-surface elevation angle, and $\beta 1$, $\beta 2$, $\beta 3$, $\beta 4$ . . . form a relative angle between the reflection surface and the connection surface, and are set at 90 degrees or more (however, 180 degrees or less) as one example. Incidentally, this example is set at $\beta 1 = \beta 2 = \beta 3 = \beta 4 = \ldots = \beta 2 = \ldots \beta 130$.

Figure 23:
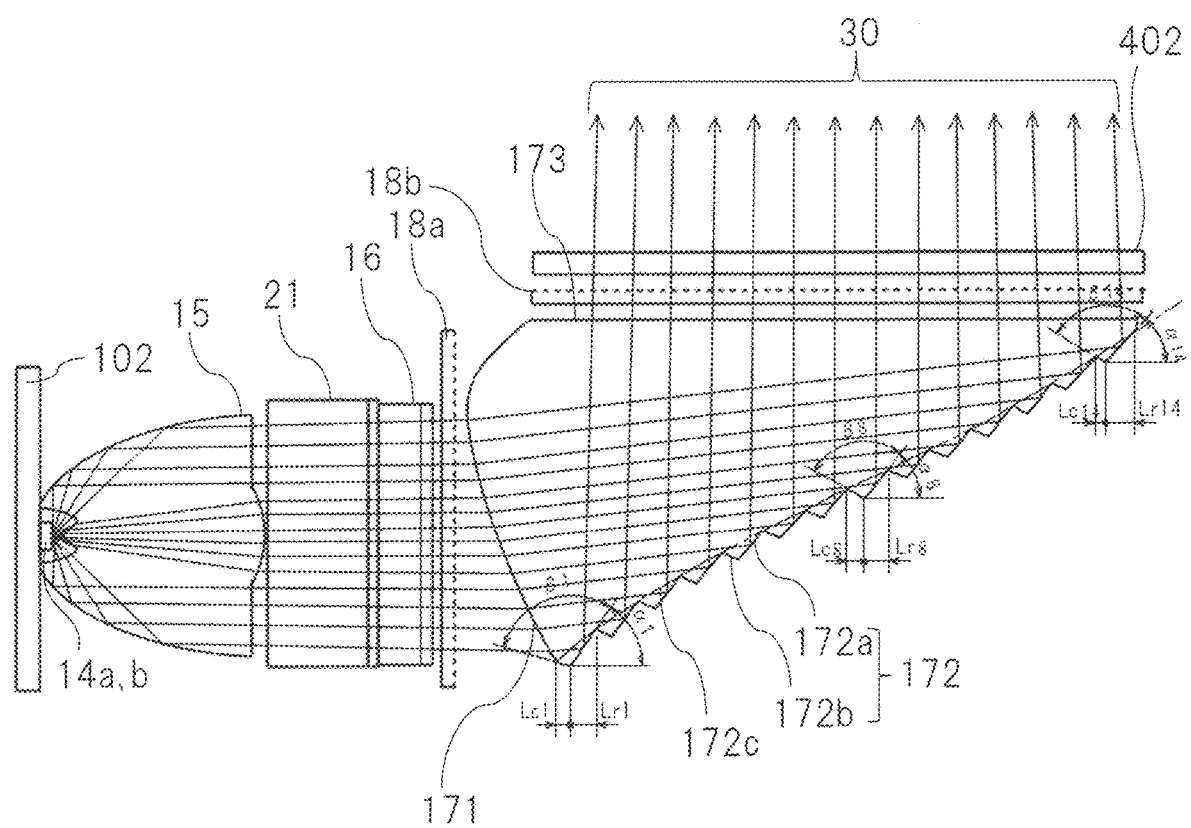
FIG. 23 is a schematic sectional view showing a configuration of the light source apparatus according to the embodiment.
Figure 24:
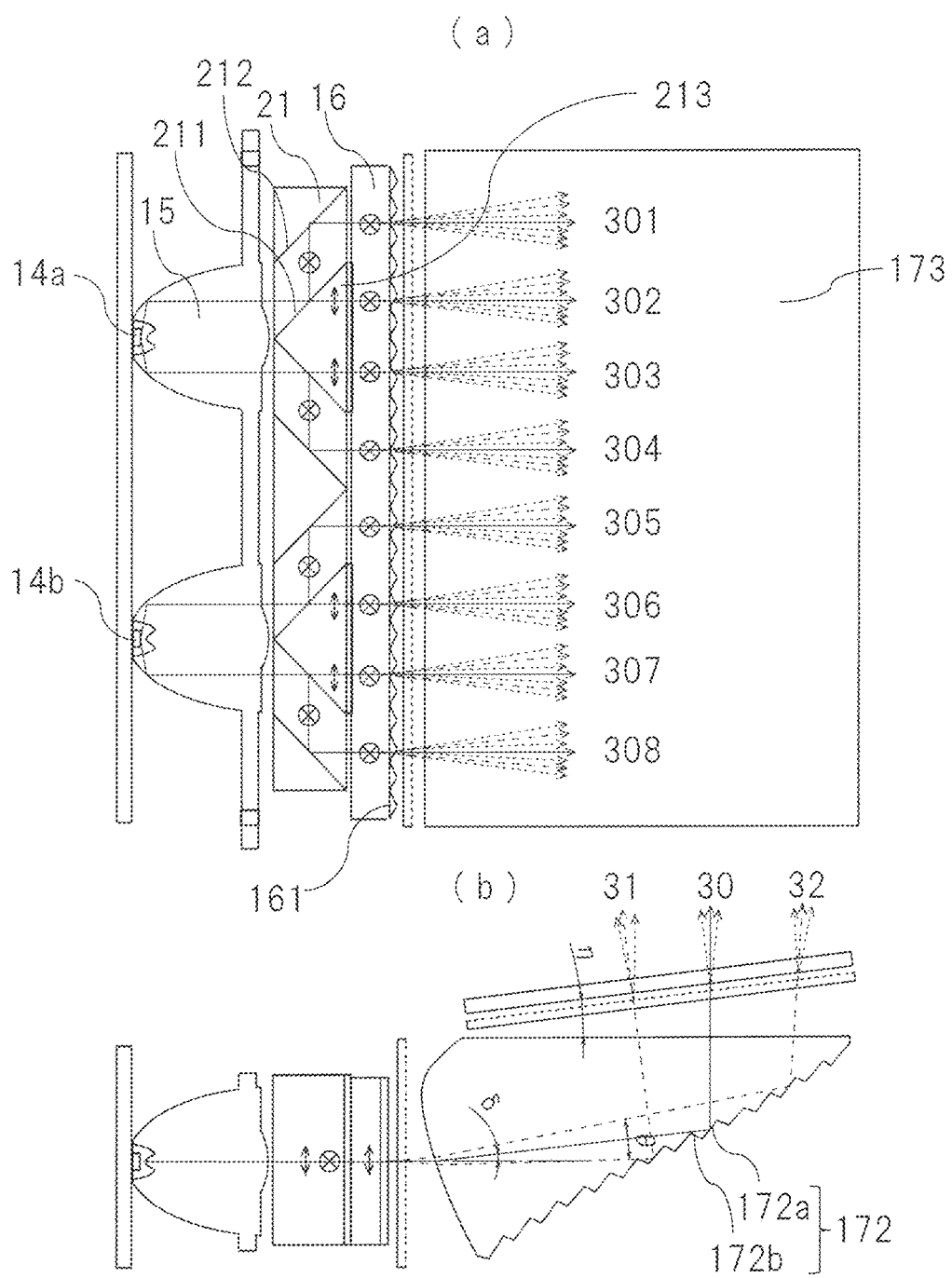
FIG. 24 is a schematic diagram showings a configuration of the light source apparatus which is the embodiment.

FIGS. 23 and 24 show schematic diagrams in which sizes of the reflection surface 172a and the connection surface 172b are relatively enlarged with respect to the light guide 17 for the purpose of explanation. In the light-guide incidence portion (surface) 171 of the light guide 17, a main light ray is deflected only by an angle δ in such a direction that an incident angle becomes larger with respect to the reflection surface 172a (see FIG. 24(b)). That is, the light-guide incidence portion (surface) 171 is formed in a convex shape like a curve inclined on a light source side. By such formation, the parallel light from the emission surface of the optical composite block 16 is diffused through the first diffuser 18a and is incident on the light-guide incidence portion (surface) 171 and, as is apparent also from the figure(s), reaches the light-guide light-reflection portion (surface) 172 while being slightly bent (deflected) upward by the light-guide light-incidence surface (portion) 171.

Incidentally, a large number of reflection surfaces 172a and a number of connection surfaces 172b are alternately formed in serrate shapes on this light-guide light-reflection portion (surface) 172, so that diffused light is totally reflected on each of the reflection surfaces 172a, is directed upward, and further is incident on, as parallel, diffused light rays, the liquid crystal display panel 402 of the liquid crystal display element 50 through the light-guide light-emission portion (surface) 173 or the second diffuser 18b as shown in FIG. 4. Therefore, the reflection-surface elevation angles $\alpha 1$, $\alpha 2$, $\alpha 3$, $\alpha 4$ . . . are set so that each reflection surface 172a has an angle equal to or more than a critical angle with respect to the diffused light, while the relative angles $\beta 1$, $\beta 2$, $\beta 3$, $\beta 4$ . . . between the reflection surfaces 172a and the connection surfaces 172b are set at constant angles as described above, more preferably at an angle of 90 degrees or more ($\beta n \geq 90°$) although a reason(s) for such setting is mentioned later.

By the above-described configuration, the light source apparatus has such a configuration that each reflection surface 172a always has an angle greater than or equal to the critical angle with respect to the diffused light. Therefore, even if a reflection film(s) made of metal etc. is not formed on the reflection portion 172, the total reflection becomes possible, which makes it possible to realize the light source apparatus at lower cost.

Further, the reflection-surface elevation angles $\alpha 1$, $\alpha 2$, $\alpha 3$, $\alpha 4$, . . . have values gradually increasing as moving from a lower portion to an upper portion of the light-guide light-reflection portion (surface) 172. This is for realizing the following configuration: the light transmitting the liquid crystal display panel 402 of the liquid crystal display element has a divergence angle to a certain degree, so that a part of the light particularly transmitting a peripheral portion of the liquid crystal display panel 52 is vignetted (shaded) at a peripheral edge of a mirror disposed downstream, i.e., so-called peripheral vignetting (shading) is caused and, for the purpose of preventing the peripheral vignetting from occurring, the light rays at the periphery portion are slightly deflected in the central axis direction as shown by light rays 30 in FIG. 23.

Also, Lr1, Lr2, Lr3, Lr4 . . . in FIG. 23 indicate projection lengths of the reflection surfaces 172a to a horizontal surface, and Lc1, Lc2, Lc3, Lc4 . . . indicate projection lengths of the connection surfaces 172b to the horizontal surface. A ratio Lr/Lc, that is, a ratio between the reflection surface 172a and the connection surface 172b is structurally variable depending on a place(s). An intensity distribution of the main light rays 30 incident on the light guide 17 does not necessarily coincide with an intensity distribution as desired on a liquid-crystal-display-panel incident surface. Therefore, a configuration in which the intensity distribution is adjusted by the ratio Lr/Lc of the reflection surface 172a and the connection surface 172b has been adopted. Incidentally, as the ratio is higher (enhanced), an average intensity of a part of the reflected light having the higher ratio can be made higher (enhanced). Generally, a center portion of the light rays 30 incident on the light guide tends to be strong in intensity, so that the ratio Lr/Lc has been configured so as to be different depending on the place for correction of such an intensity, particularly, so that the center portion becomes smaller. Since the ratio Lr/Lc is set so as to be different depending on the place (location) and the above-described reflection-surface elevation angles α1, α2, α3, α4 . . . are are set so as to be different depending on the place, an envelope 172c representing an outline shape of the reflection portion 172 is a curved shape as shown in FIG. 23.

Further, Lr1+Lc1=Lr2+Lc2=Lr3+Lc3=Lr4+Lc4 . . . =Lr+ Lc<0.6 mm is set in this case. Adopting such a configuration makes it possible to make repetitive pitches of the reflection surfaces viewed from the light emission surface 173 of the light guide 17 the same. Moreover, since the pitch is 0.6 mm or less, the individual emission surfaces are not separated and appear as a continuous surface in combination (cooperation) with action and effects of the diffusers 18a, 18b when viewed from the liquid crystal display panel 402. This brings achievement of making spatial luminance through the liquid crystal display panel 402 uniform, which improves display characteristics. That is, such a configuration makes it possible to make an incident-light intensity distribution onto the liquid crystal display panel 402 uniform. On the other hand, when a value of Lr+Lc is smaller than 0.2 mm, machining time is required and machining each reflection surface 172a with high accuracy becomes difficult simultaneously therewith, so that the above value is desirably 0.2 mm or more.

The shape of the light-guide light-reflection portion (surface) 172 of the above-mentioned light guide 17: makes it possible to satisfy a total reflection condition(s) of the main light; does not need to provide the reflection portion 172 with a reflection film such as aluminum; makes it possible to efficiently reflect light; does not need deposition work etc. of an aluminum thin film, the work involving an increase in manufacturing cost; and makes it possible to realize the light source having the bright S-wave component (s-polarized wave) at lower cost. Further, each relative angle β has been set to such an angle that the connection surface 172b is shadowed with respect to light whose main light rays 30 are diffused by the optical composite block 16 and the diffuser 18a. By the above-set angle, suppressing the incidence of the unnecessary light to the connection surface 172b makes it possible to reduce the reflection of the unnecessary light, and to realize the light source apparatus with excellent characteristics.

Further, according to the above-mentioned light guide 17, since the reflection-surface elevation angles α1, α2, α3, α4 . . . are appropriately set, a length of the light emission surface 173 in the optical axis direction can be freely varied, which makes it possible to realize the light source apparatus capable of appropriately changing a size (surface size) of the light emission surface 173 to a necessary size (surface size), the size of the light emission surface being adapted to an apparatus such as the above-mentioned liquid crystal display panel 402. This also makes it possible to change the size of the light emission surface 173 to a desired size without depending on arrangement shapes of the LEDs 14a, 14b constituting the light source, so that a planar light emission source with a desired size leads to being obtained. Furthermore, obtaining the planar light emission source also leads to securing a degree of freedom in a design including arrangement of the LEDs 14a, 14b constituting the light source, which may be advantageous for the miniaturization of the entire apparatus.

Figure 25:
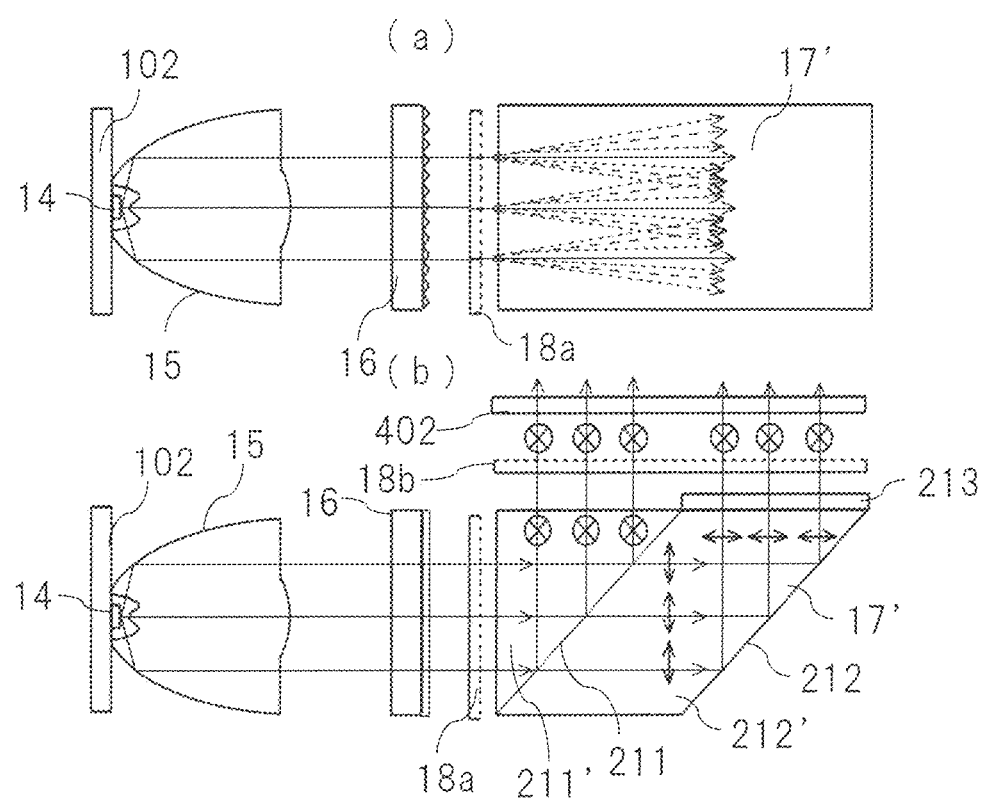
FIG. 25 is an explanatory diagram for explaining a polarization conversion technique according to the embodiment.

Additionally, as shown also in FIG. 25, the light guide 17 disposed behind the optical composite block 16 may also be a member (light guide 17') configured by a polarization conversion element instead of a normal translucent (light transmitting) resin. Incidentally, as is apparent also from the figure, this configuration is made by combining a triangular-prismatic translucent member 211' and a parallelogram-pillar translucent member 212'; a PBS film 211 is formed on an interface between their combined members, the PBS film reflecting the S-polarized wave (see the symbol (x) in the figure) of the incident light that is emitted from the collimator 14 and is made parallel light by the LED collimator 15, while the PBS film transmitting the P-polarized wave (see upper and lower arrows in the figure); and a half wave plate 213 is formed on an upper surface of the parallelogram-pillar translucent member 212', and the reflection film 212 is formed on a side surface thereof.

According to the above-described configuration, as is apparent also from the figure, the incident light emitted from the LED 14 and made parallel light by the LED collimator 15 is polarized to the S-polarized wave by the light guide 17' composed of a polarization conversion element replacing the light guide 17, thereby leading to being emitted upward from an upper surface of such an element. That is, the above-described configuration particularly makes it possible to significantly miniaturize the apparatus and reduce the manufacturing cost of the apparatus since the light guide 17 made of a normal translucent resin is eliminated from the apparatus.

That is, using the above-mentioned light source apparatus 10 as a light source apparatus of the liquid crystal display element serving as the video-image display apparats 4 realizes an S-polarized-wave light source apparatus that has a lesser light emission source (about the number of LEDs, power consumption) and is modularized with a small size and high efficiency. Then, the above-mentioned concave mirror 1 and optical means 3 make it possible to: remove the unnecessary IR and UV; effectively reduce the P-wave component (p-polarized wave) exerting an adverse effect such as yellowing carbonation on the video-image display apparatus 4 and/or the peripheral polarizer, etc. to reduce the damage due to the sunlight; and realize the information display apparatus 100 capable of excellent information display by using the S-wave component (s-polarized wave).

As detailed above, the above-described information display apparatus 100 to be the present invention makes it possible to further improve the light utilization efficiency and/or the uniform illumination characteristics thereof and, simultaneously therewith, be manufactured at the small size and low cost including the modularized S-polarized-wave light source apparatus. Incidentally, the polarization conversion element 21 in the above explanation has been described as an element (member) to be attached behind (after) the LED collimator 15. However, the present invention is not limited thereto, and it will be apparent to those skilled in the art that almost the same actions and effects are obtained also by providing the polarization conversion element in a light path(s) reaching to the liquid crystal display element.

<Other Configurations>

According to the above-mentioned information display apparatus 100, the unnecessary IR or/and UV of the sunlight can be removed by the concave mirror 1 or/and the optical means 3 during an operation(s) of the information display apparatus. However, for example, when the vehicle is stopped at a parking lot (place) etc. and its engine key is turned off, the operation of the information display apparatus 100 is unnecessary. Therefore, in such a state, the sunlight entering the vehicle is excluded from a normal light path(s), namely, it is preferable that the sunlight entering the inside of the information display apparatus 100 through the upper opening 41 is led so as not to pass a light path(s) reaching to the video-image display apparatus 4 or/and its peripheral polarizer, etc.

Figure 26:
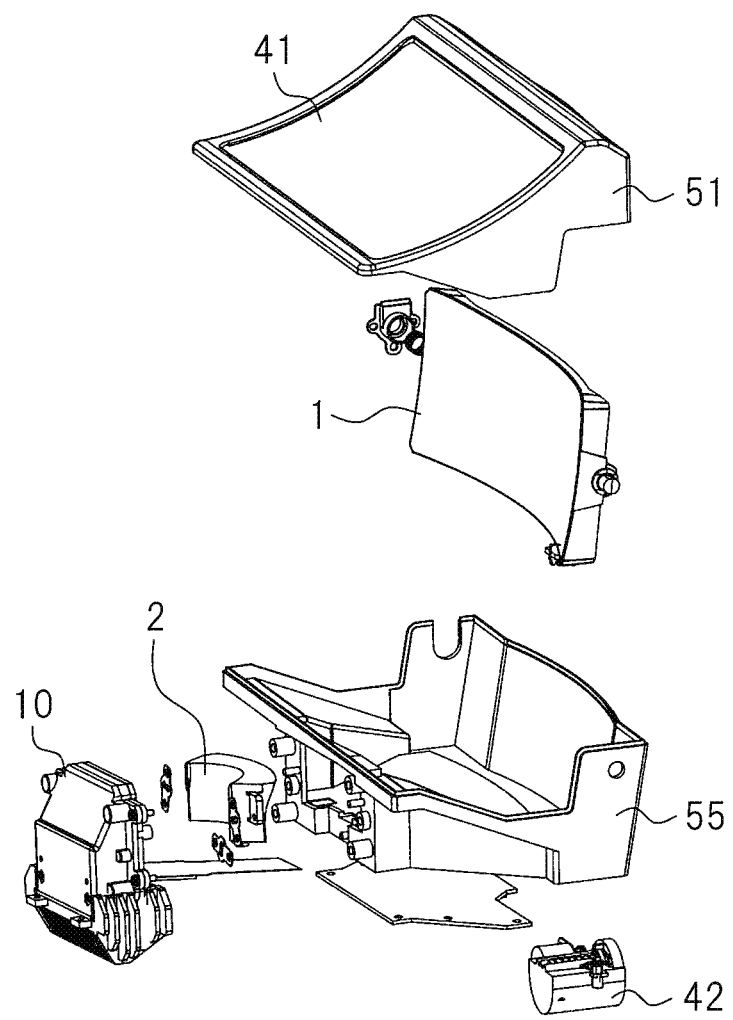
FIG. 26 is a schematic diagram showing a configuration of the information display apparatus according to the embodiment.

As an example, as shown in FIG. 26 which is an exploded perspective view showing respective components of the information display apparatus 100 in a disassembled state from its back side, a concave mirror 1 pivotably attached inside (between) exterior cases 51, 55 serving as its housing is moved, by a concave-mirror driver 42 configured by an electric motor etc. for adjusting a position of the concave mirror 1, at such a preset position that the entering sunlight is reflected in a direction not reaching to the video-image display apparatus 4 (a direction different from the normal light path). Incidentally, the operation of the concave-mirror driver 42 can be easily realized by executing software stored in advance in a ROM 34 through a CPU 35 shown in FIG. 1. This makes it possible to prevent the sunlight from bringing a situation(s) for breakage or/and deterioration (degradation) of the video-image display apparatus 4 serving as an optical component of the information display apparatus, the peripheral polarizer, the light source apparatus 10, and the like by changing a light path(s) in which the entering light travels reversely, particularly, at a vehicle stopping time etc. of causing some damages by the entering sunlight, and to more certainly prevent the sunlight from bringing such a situation also at a time of being under strong sunlight such as midsummer.

That is, when the information display apparatus is not used, rotating the concave mirror by a predetermined angle so that the sunlight returns to no video-image display apparatus makes it possible to prevent the sunlight condensed by the concave mirror from returning to the video-image display apparatus and, consequently, to provide the video-image display apparatus that significantly improves light resistance with respect to the sunlight.

As described above, various embodiments have been detailed. However, the present invention is not limited to the above embodiments and includes various modification examples. For examples, the above embodiments have described the entire system in detail in order to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

EXPLANATION OF REFERENCE SYMBOL

100 . . . Information display apparatus; 1 . . . Concave mirror; 2 . . . Lens element; 3, 3a, 3e, 3f . . . P-wave-component suppressing optical means (element); 4 . . . Video-image display apparatus (liquid crystal display element, liquid crystal display panel); 6 . . . Projected members (windshield); 7 . . . Housing; V1 . . . Virtual image; 8 . . . Eye point (eye of viewer); 10 . . . Light source apparatus; and 41 . . . Opening.

The invention claimed is:

1. An information display apparatus displaying video-image information on a projection surface by a virtual image, the apparatus comprising, in a housing partly having an opening, a video-image-light generating apparatus, a video-image-light processor, and a projector, the video-image-light generating apparatus configured to generate video-image light for displaying the video-image information, the video-image-light generating apparatus including a generator for selectively generating the video-image light by S-polarized light, the video-image-light processor configured to perform a predetermined optical processing to a video image generated by the video-image-light generating apparatus, and the projector configured to project, onto the projection surface through the opening of the housing, the video-image light optically processed by the video-image-light processor so that a viewer is capable of virtually recognizing the video-image information as a virtual image in front of the projection surface, wherein a light path in the housing is provided with a suppressor selectively suppressing a P-polarizing component of light in a visible light region, wherein the video-image-light processor and the projector are disposed on a straight-line optical axis from the video-image-light generating apparatus, and wherein the suppressor is disposed between the video-image-light generating apparatus and the projector on the straight-line optical axis, and is configured to transmit an S-polarized light component and reflect a P-polarized light component in a direction vertical to the straight-line optical axis.

2. The information display apparatus according to claim 1, further comprising a suppressor provided in the light path in the housing, the suppressor suppressing at least one or both of light rays in an infrared region and an ultraviolet region.

3. The information display apparatus according to claim 2, wherein the projector has a concave mirror, and a thin film suppressing at least one of the light rays in the infrared region and the ultraviolet region is formed on the concave mirror.

4. The information display apparatus according to claim 3, wherein the concave mirror has a reflectance of 85% or less to light in the visible light region.

5. The information display apparatus according to claim 1, wherein the video-image-light generating apparatus includes an S-polarized solid light source.

6. The information display apparatus according to claim 3, wherein the concave mirror is moved at such a position at a time of not operating the information display apparatus that external light traveling from the opening to an inside of the housing is reflected in a direction different from a normal light path at a time of operating the information display apparatus.

* * * * *